(12) United States Patent
Lee et al.

(10) Patent No.: US 10,382,908 B2
(45) Date of Patent: Aug. 13, 2019

(54) METHOD AND APPARATUS FOR TRANSMITTING AN SOAP MESSAGE IN A MOBILE COMMUNICATION SYSTEM

(75) Inventors: Sung Won Lee, Yongin-si (KR); Han Na Lim, Seoul (KR); Somg Yean Cho, Seoul (KR)

(73) Assignees: Samsung Electronics Co., Ltd., Suwon-si (KR); Kyung Hee University Industry Academic Cooperation Foundation, Yongin-si (KR)

( * ) Notice: Subject to any disclaimer, the term of this patent is extended or adjusted under 35 U.S.C. 154(b) by 1032 days.

(21) Appl. No.: 13/876,319

(22) PCT Filed: Oct. 27, 2011

(86) PCT No.: PCT/KR2011/008055
§ 371 (c)(1),
(2), (4) Date: Mar. 27, 2013

(87) PCT Pub. No.: WO2012/057534
PCT Pub. Date: May 3, 2012

(65) Prior Publication Data
US 2013/0196698 A1    Aug. 1, 2013

(30) Foreign Application Priority Data
Oct. 27, 2010    (KR) .................. 10-2010-0104996

(51) Int. Cl.
*H04W 4/14*    (2009.01)
*H04W 4/18*    (2009.01)
(Continued)

(52) U.S. Cl.
CPC ............... *H04W 4/14* (2013.01); *H04L 69/04* (2013.01); *H04L 69/08* (2013.01); *H04W 4/18* (2013.01); *H04L 67/02* (2013.01); *H04W 80/08* (2013.01)

(58) Field of Classification Search
CPC ......... H04L 67/42; H04L 67/02; H04L 67/06; H04L 67/16; H04L 67/40; H04L 69/08;
(Continued)

(56) References Cited

U.S. PATENT DOCUMENTS

2002/0046239 A1    4/2002    Stawikowski et al.
2005/0027731 A1*   2/2005    Revel .................. H04L 69/04
(Continued)

FOREIGN PATENT DOCUMENTS

KR    10-2005-0000122 A    1/2005

*Primary Examiner* — Younes Naji
*Assistant Examiner* — Da T Ton
(74) *Attorney, Agent, or Firm* — Jefferson IP Law, LLP

(57) ABSTRACT

The present invention relates to a method and apparatus for transmitting simple object access protocol (SOAP) message, and the method includes sharing, an index table including information for use in compressing a SOAP message or recovering the SOAP message from the compressed-SOAP message; converting, when the operator server requests for transmission of the SOAP message to the wireless device, the SOAP message to the compressed-SOAP message using the index table and transmitting the compressed-SOAP message to the wireless device; and converting, when the wireless device requests for transmission of the compressed-SOAP message to the operator server, the compressed-SOAP message to the SOAP message using the index table and transmitting the SOAP message to the operator server. The present invention is capable of SOAP-based message transmission/reception in an environment where the IP service is not supported.

12 Claims, 35 Drawing Sheets

(51) Int. Cl.
  *H04L 29/06* (2006.01)
  *H04W 80/08* (2009.01)
  *H04L 29/08* (2006.01)

(58) Field of Classification Search
  CPC ... H04L 69/16; H04L 69/06047; H04L 69/18;
             H04L 69/04; H04L 29/06; H04L
             29/06027; H04L 29/08117; H04L
             29/12132; H04L 41/0213; H04L 43/18;
             H04N 1/00217; H04N 21/6437; H04N
             21/658; G06F 9/44505; G06F 11/3414;
             G06F 17/30076; G06F 2209/541; H04W
             80/00; H04W 80/045; H04W 4/14
  USPC .................. 709/203, 230–232, 246–247
  See application file for complete search history.

(56) References Cited

U.S. PATENT DOCUMENTS

| | | | |
|---|---|---|---|
| 2005/0198304 A1* | 9/2005 | Oliver | H04L 67/2823 |
| | | | 709/227 |
| 2005/0288044 A1* | 12/2005 | Atkins | H04L 51/38 |
| | | | 455/466 |
| 2007/0077922 A1* | 4/2007 | Kim | H04H 20/57 |
| | | | 455/414.2 |
| 2007/0136492 A1* | 6/2007 | Blum | G06Q 10/107 |
| | | | 709/247 |
| 2010/0125641 A1* | 5/2010 | Shelby | H04L 67/16 |
| | | | 709/206 |

* cited by examiner

FIG. 10

Example XML Schema Definition

```
<schema
 targetNamespace='interfaceURI' >

<type name='fRequest'>
  <element name='a1' type='float' />
  <element name='a2' type='float' />
  <anyAttribute
    namespace='uriForSoap' />
</type>

<type name='fResponse' >
  <element name='a2' type='float' />
  <element name='result' type='float' />
  <anyAttribute
    namespace='uriForSoap' />
</type>

<element name='fRequest' type='fRequest' />

<element name='fResponse' type='fResponse' />

</schema>
```

FIG. 11

SOAP XML of Method 'fRequest'

```
<SOAP:Envelope
 xmlns:SOAP='urn:schemas-xmlsoap-org:soap.v1'>
 <SOAP:Body>
  <i:fRequest
   xmlns:i='interfaceURI'>
   <a1>24</a1>
   <a2>87</a2>
  </i:f>
 </SOAP:Body>
</SOAP:Envelope>
```

FIG. 12

SOAP XML of Method 'fResponse'

```
<SOAP:Envelope
 xmlns:SOAP='urn:schemas-xmlsoap-org:soap.v1'>
<SOAP:Body>
 <i:fResponse
  xmlns:i='interfaceURI'>
  <a2>87.5</a2>
  <result>2.4</result>
 </i:fResponse>
</SOAP:Body>
</SOAP:Envelope>
```

FIG. 13

Extracted XML Schema Definition Information

| Schema Name | Method Name | Parameter Number | Parameter Type List | Parameter Name List |
|---|---|---|---|---|
| "interfaceURI" | "fRequest" | 2 | { float, float } | { 'a1' , 'a2' } |
| "interfaceURI" | "fResponse" | 2 | { float, float } | { 'a2' , 'result' } |

FIG. 14

Method Index Table

| Method Index | Schema Name | Method Name | Parameter Number | Parameter Type List | Parameter Name List | SOAP Information |
|---|---|---|---|---|---|---|
| 01 | "interfaceURI" | "Request" | 2 | { float, float } | { 'a1', 'a2' } | urn:schemas-xmlsoap-org:soap.v1 |
| 02 | "interfaceURI" | "Response" | 2 | { float, float } | { 'a2', 'result' } | urn:schemas-xmlsoap-org:soap.v1 |
| ... | ... | ... | ... | ... | ... | ... |

FIG. 17

Registered Service Server Table

| DESTINATION IDENTIFIER | OPERATOR SERVER IDENTIFIER |
|---|---|
| 010-ABCD-EFGH | ServiceServer_1 |
| ... | ... |

FIG. 19

| | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Character Mode | '0' | '1' | '2' | '3' | '4' | '5' | '6' | '7' | '8' | | | | | | | | | | | |
| Binary Mode | 1 | 24 | | | | | | | | | | | | | | | | | | |
| Character Mode without Delimiter | '0' | '1' | '2' | '4' | '8' | '7' | | | | | | | | | | | | | | |
| Binary Mode without Delimiter | 1 | 24 | 87 | | | | | | | | | | | | | | | | | |

Converted SOAP XML of Method 'f'

FIG. 21

| | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Character Mode | '0' | '2' | '' | '8' | '7' | '5' | '' | '' | '' | '' | '4' | '3' | | | | | | | | |
| Binary Mode | 2 | | 87.5 | | | | | | 24 | | | | | | | | | | | |
| Character Mode without Delimiter | '0' | '2' | '8' | '7' | '' | '5' | '2' | '' | '4' | | | | | | | | | | | |
| Binary Mode without Delimiter | 2 | | 87.5 | | | | 24 | | | | | | | | | | | | | |

Converted SOAP XML of Method 'fResponse'

FIG. 33

Registered UE Table

| Destination Identifier | UE Identifier |
|---|---|
| 010-ABCD-YYYY | 163.180.XXX.XXX |
| ... | ... |

FIG. 35

Registered Service Server Table

| Destination Identifier | Service Server Identifier |
|---|---|
| 010-ABCD-EFGH | 163.181.XXX.XXX |
| ... | ... | ns
METHOD AND APPARATUS FOR TRANSMITTING AN SOAP MESSAGE IN A MOBILE COMMUNICATION SYSTEM

BACKGROUND OF THE INVENTION

Field of the Invention

The present invention relates to a mobile communication system and, in particular, to a method and apparatus for transmitting SOAP protocol-based message in an environment where the IP protocol is not supported.

Particularly, the present invention has been conceived to operate the radio device located remotely from IP-based Internet environment and provides a method and apparatus for supporting Simple Object Access Protocol (SOAP) in a Short Message Service (SMS) and Cell Broadcast Service (CBS) environment of the conventional mobile communication system, which has a transmission capacity limited to a few dozen bytes other than the IP environment.

Description of the Related Art

Mobile communication systems developed to provide the subscribers with voice communication services on the move. With the advance of technologies, the mobile communications have been evolved to support high speed data communication services as well as the standard voice communication services. However, there is a need of more sophisticated mobile communication system to mitigate resource shortage and meet the high-speed service requirements of the subscribers.

However, the conventional mobile communications has a problem of difficulty in supporting the radio communication networks or devices operating based on the $2^{nd}$ Generation communication or circuit switched technology, i.e. inappropriate for Internet Protocol (IP) communication. In the conventional $2^{nd}$ Generation communication or circuit-switched radio communication technology, the circuit-switched voice service and SMS/MMS-based short message services are dominant, it is not easy to support IP communication technology. Particularly, a SOAP message is large in size and thus cannot be transmitted through SMS/CBS supporting the capacity of up to 80 bytes.

DISCLOSURE OF INVENTION

Technical Problem

The present invention has been made in an effort to solve the above problem and it is an object of the present invention to provide a method and apparatus for supporting SOAP-based message transmission/reception in the IP communication environment. Particularly, the present invention aims at supporting SOAP in the radio communication network characterized by low speed channel other than high speed packet channel.

It is another object of the present invention to provide a SOAP message conversion technique for delivery of SOAP message over a low speed channel or small capacity radio message. With the conversion technique, the SOAP message of a few dozen to a few hundred bytes can be transmitted/received over SMS protocol and CBS protocol designed for transmitting small size information about 80 bytes.

It is still another object of the present invention to minimize the modification of the operator's premises for utilization of the mobile communication network by minimizing the influence to the nodes of the conventional mobile communication system.

Solution to Problem

In order to solve the above problem, a method for transmitting/receiving a Simple Object Access Protocol (SOAP) message in a mobile communication system includes sharing, at an operator server, a method index table including information for use in compressing a SOAP message to be transmitted to a wireless device or recovering the SOAP message from the compressed-SOAP message with a conversion gateway and the wireless device; converting, at the conversion gateway when the operator server requests for transmission of the SOAP message to the wireless device, the SOAP message to the compressed-SOAP message using the method index table and transmitting the compressed-SOAP message to the wireless device; and converting, at the conversion gateway when the wireless device requests for transmission of the compressed-SOAP message to the operator server, the compressed-SOAP message to the SOAP message using the method index table and transmitting the SOAP message to the operator server.

Also, an apparatus for transmitting/receiving a Simple Object Access Protocol (SOAP) message in a mobile communication system, the apparatus includes an operator server which delivers the SOAP message; a wireless device which generates a compressed-SOAP message to be sent to the operator server; and a conversion gateway which generates and shares a method index table including information for use in compressing a SOAP message to be transmitted to a wireless device or recovering the SOAP message from the compressed-SOAP message with the wireless device, converts, when the operator server requests for transmission of the SOAP message to the wireless device, the SOAP message to the compressed-SOAP message using the method index table and transmits the compressed-SOAP message to the wireless device, and converting, when the wireless device requests for transmission of the compressed-SOAP message to the operator server, the compressed-SOAP message to the SOAP message using the method index table and transmits the SOAP message to the operator server.

Advantageous Effects

According to the present invention, first, it is possible to transmit/receive SOAP-based message in the environment where the IP communication is not supported. Particularly, it is aimed to operate the SOAP on the low speed channel of wireless communication network other than high speed packet channel Second, the present invention provides a SOAP message conversion technique for facilitating SOAP message delivery over low speed channel and small size wireless message, whereby it is possible to transmit/receive the SOAP message over SMS protocol and CBS protocol designed for delivering small amount of information of up to 80 bytes.

Third, the proposed method minimizes the influence to the legacy server so as to minimize modification of the third party operator's premises for utilization of the wireless communication network.

BRIEF DESCRIPTION OF THE DRAWINGS

FIG. 10 is a diagram illustrating a data format of a normal SOAP message.

FIG. 11 is a diagram illustrating the grammar used for calling the fRequest function defined in FIG. 10 to a remote device.

FIG. 12 is a diagram illustrating the grammar for use in calling fResponse function defined in FIG. 10 to a remote device.

FIG. 13 is a diagram illustrating the information on the SOAP function newly defined by the operator server 410.

FIG. 14 is a diagram illustrating the structure of method index table defined according to an embodiment of the present invention.

FIG. 17 is a diagram illustrating the identifier and MSISDN of the operator server 410 that are stored in the server database of the SMS/CBS gateway 440 and the wireless device 470.

FIG. 19 is a diagram illustrating a compressed-SOAP message format converted from fRequest message of FIG. 11 to be fit for SMS/CBS transmission using the method index table.

FIG. 21 is a diagram illustrating a format of the compressed-SOAP message converted from the fResponse message of FIG. 12 to be fit for SMS/CBS transmission using the method index table.

FIG. 33 is a diagram illustrating the structure of the registered UE table stored in the server database according to the third additional embodiment of the present invention.

FIG. 35 is a diagram illustrating a structure of the roistered UE table stored in the server database according to the third additional embodiment of the present invention.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

Figure 1:
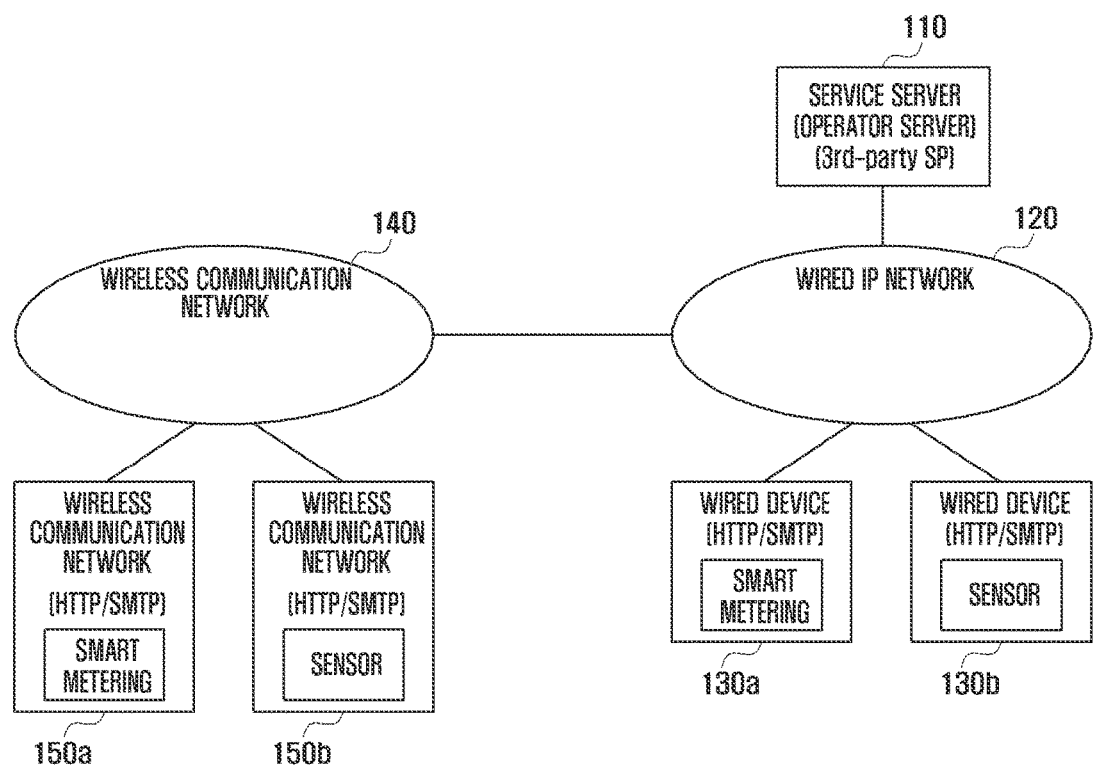
FIG. 1 is a diagram illustrating the architecture of a conventional mobile communication system.

FIG. 1 is a diagram illustrating the architecture of a conventional mobile communication system.

In the convention technology, the nodes are communicating based on Internet Protocol (IP). In the network architecture of FIG. 1, it is assume that the operator server 110 controls Smart Metering 130a and 150a or various sensors 130b and 150b through the wired IP network 120 and the wireless communication network 140, collects information form the corresponding devices, and manages the corresponding devices. In this case, the operator server 110 can be the premises of the network operator owned the wired IP network 120 and the wireless communication network 140 or a Third Party Service Provider who uses the network for counter value.

In the conventional communication network, the voice and text information delivery is the main service. Unlike the message carrying the information recognizable by human in the network, however, the messages exchanged in the Machine-to-Machine (M2M) or Machine-Type Communication (MTC) environment are of commands executing a function of the remote machine and replies. The most appropriate and widely used technology for the above function is the Simple Object Access Protocol (SOAP).

In the conventional technology, the devices connected to the wired or wireless communication network communicate over IP. In order to transmit/receive SOAP messages, Hyper-Text Transfer Protocol (HTTP) or Simple Mail Transfer Protocol (SMTP) is used, and the SOAP messages operate over these protocols.

Figure 2:
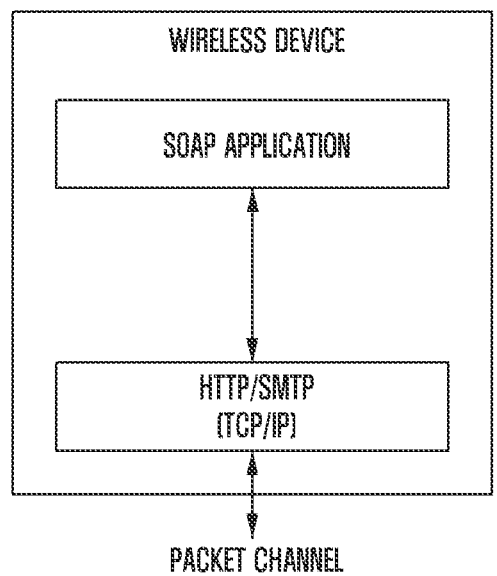
FIG. 2 is a block diagram illustrating the configuration of a mobile device of a conventional wireless communication network.

FIG. 2 is a block diagram illustrating the configuration of a mobile device of a conventional wireless communication network.

As shown in FIG. 2, the conventional mobile device uses a wireless packet transmission channel and operates on IP. For this purpose, the radio device operates the protocol such as HTTP/SMTP on the transport layer protocol such as Transmission Control Protocol/User Datagram Protocol (TCP/UDP), and operates an application program operating based on the SOAP on top of the protocol stack.

Figure 3:
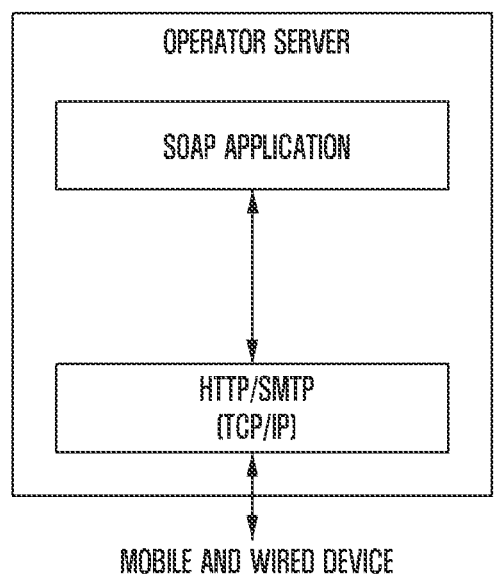
FIG. 3 is a block diagram illustrating the configuration of the operator server 110 controlling and managing the devices connected to the convention wired or wireless network.

FIG. 3 is a block diagram illustrating the configuration of the operator server 110 controlling and managing the devices connected to the convention wired or wireless network.

As shown in FIG. 3, the operator server supports the transport protocol such as TCP/UDP on the IP layer, the HTTP/SMTP on the TCP/UDP layer, and SOAP-based application program on top of the protocol stack.

The conventional technology has a problem in that the conventional wireless communication network uses the $2^{nd}$ Generation communication or Circuit-Switched technology, i.e. is difficult to support the wireless communication network or devices inappropriate for IP communication. The wireless communication technology using conventional $2^{nd}$ Generation or Circuit-Switched technology provides the circuit-switched voice service and SMS/MMS-based short messaging service as main services. Accordingly, the conventional wireless communication network is not appropriate for supporting IP communication technology. Particularly, the SOAP message is too large in size to transmit using SMS/CBS supporting the capacity of up to 80 bytes.

The convention technologies for the $3^{rd}$ and $4^{th}$ generation mobile communication also have problems. In order for the operator server to transmit information to the mobile terminal connected to the wireless communication network whenever it wants, the corresponding mobile terminal has to stay in the connected state (always-on). That is, the mobile terminal has to connect to the wireless communication network to be allocated an IP address and interwork with a database for maintaining/managing the corresponding IP session.

In this situation, there is no problem in frequent or large amount of information exchange between the operator server and the mobile device. In the case that the information exchange is small in amount and occurs at long period or sporadically, it is irrational to allocate IP addresses to al mobile devices and maintain and manages the IP addresses. Particularly in the environment where the information amount to be transmitted/received is just a few dozen bytes, the control information amount exchanged over the wireless and wired links for maintaining and managing the IP communication environment is likely to be greater than the substantial information traffic to be transmitted.

The above described problems of the conventional technology can be summarized as following: first, all terminals should be always allocated IP addresses such that the number of requested IP addresses may become greater than the number of available IP addresses; second, in order to maintain the connected state (always-on), the data and load to be managed in the wireless communication network increases; and third, when the data amount to be transmitted/received is small as much as a few dozen bytes, the signal information amount on the wireless and wired links for maintaining and managing the corresponding session may be greater than the substantial data amount to be transmitted.

The present invention has been made in an effort to solve the above problems and it is an object of the present invention to provide a method and apparatus for transmitting/receiving SOAP message in the environment where IP is not supported.

Figure 4:
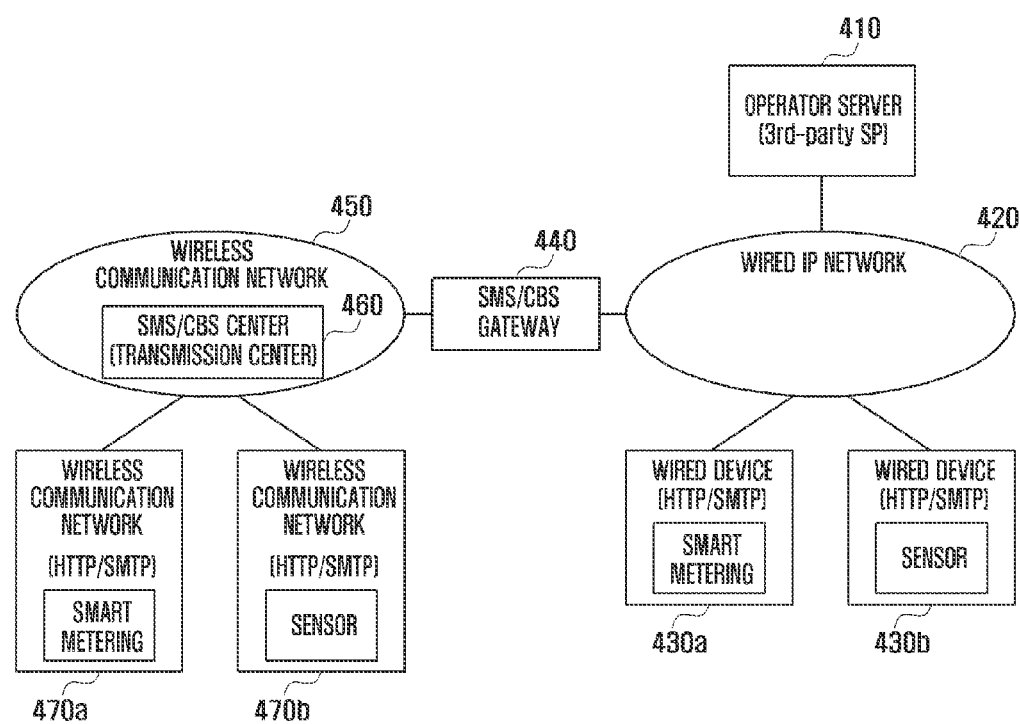
FIG. 4 is a diagram illustrating the architecture of the wireless communication network according to an embodiment of the present invention.

FIG. 4 is a diagram illustrating the architecture of the wireless communication network according to an embodiment of the present invention. The wireless communication network of the present invention, includes an operator server 410, a wired IP network 420, wired devices 430a and 430b, an SMS/CBS gateway (conversion gateway) 440, a wireless communication network 450, an SMS/CBS center (transmission center) 460, and wireless devices 470a and 470b.

An embodiment of the present invention is applicable in other embodiments, and FIG. 4 shows the basic network architecture. The wireless communication network depicted in FIG. 4 differs from the conventional wireless network in that the IP-based protocol such as HTTP/SMTP is changed for the mobile communication function such as SMS/CBS although the functions of the wireless devices 470a and 470b connected to the wireless communication network are maintained.

For SMS/CBS transmission, the SMS/CBS center 460 of the wireless communication network is used. In order for the operator server 410 to transmit the soap message to the wireless devices 470a and 470b through SMS/CBS, the SMS/CBS gateway (or conversion gateway) 440 is used. The SMS/CBS gateway 440 is positions between the wireless communication network 450 and the wired IP network 420 or inside of the wireless communication network 450.

Figure 5:
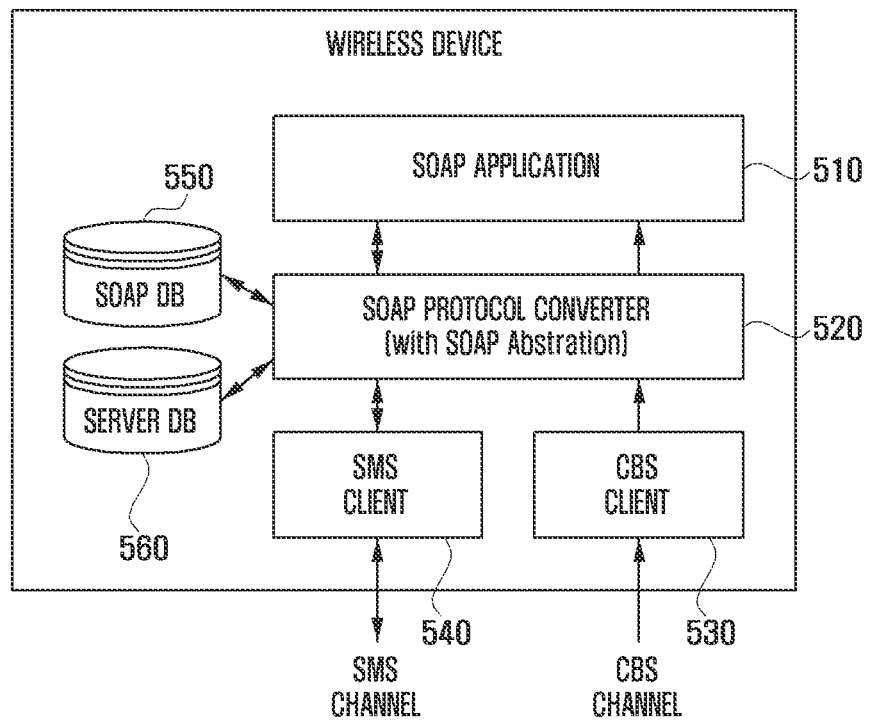
FIG. 5 is a diagram illustrating the configuration of the wireless communication device according to an embodiment of the present invention.

FIG. 5 is a diagram illustrating the configuration of the wireless communication device according to an embodiment of the present invention. The wireless device 470a (or 470b) depicted in FIG. 5 supports the SOAP service based on SMS/CBS but not IP-based communication.

The wireless device of FIG. 5 according to the present invention differs from the conventional wireless device in that it uses the SMS/CBS other than IP-based communication protocol and includes an SOAP protocol convertor 520.

The SOAP application 510 analyzes and processes the corresponding message at the SOAP level.

The SOAP protocol converter 520 converts the SOAP message of a few dozen to a few hundred bytes to a compressed-SOAP message (or converted SOAP) format for delivery over the low speed wireless channel. The SOAP protocol converter 520 converts the compressed-SOAP message received through SMS/CBS to the original SOAP message format so as to be delivered to the SOAP application 510. The SOAP protocol converter 520 also converts the SOAP message to be transmitted from the SOAP application 510 to the operator server 410 to the compressed-SOAP message format available for transmission through SMS.

The CBS client 530 controls to transmit the same information to all or restricted terminals through the wireless communication network 450 simultaneously. In this case, the CBS client 530 transmits the information through the wireless channel capable delivering the CBS message unidirectionally.

Meanwhile, the SMS client 540 supports bidirectional communication so as to transmit the SMS message to the wireless device ore receive the SMS message from the wireless device, the received SMS message being delivered to the SOAP protocol converter.

The SOAP database (SOAP DB) 550 includes the information necessary for the SOAP protocol converter 520 to convert the SOAP message to the compressed-SOAP message and vice versa.

The server database (Server DB) 560 includes the identifier of the operator server 410 to which the corresponding wireless terminal device transmit information. If the information exchange is performed bi-directionally through SMS, it is assumed that the SMS identifier of the corresponding operator server 410 is used.

Figure 6:
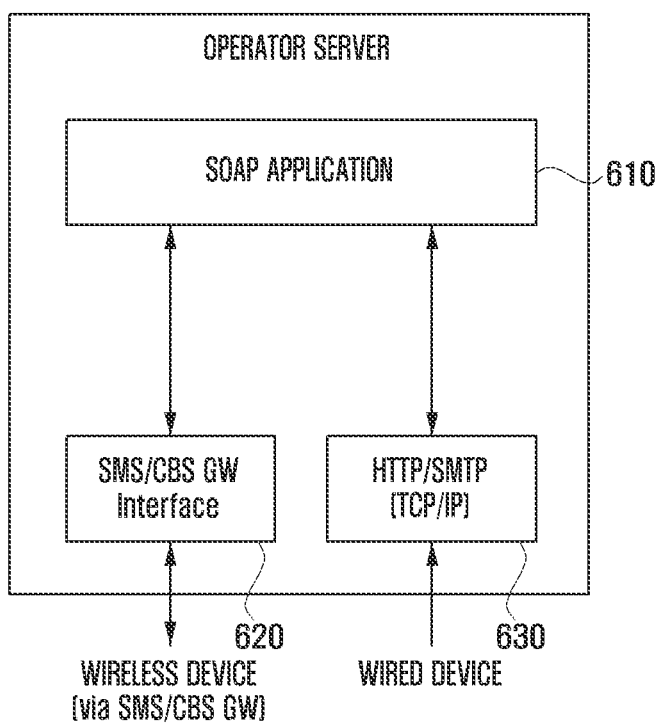
FIG. 6 is a block diagram illustrating the configuration of the operator server 410 according to an embodiment of the present invention.

FIG. 6 is a block diagram illustrating the configuration of the operator server 410 according to an embodiment of the present invention.

Although the block diagram of FIG. 6 is directed to the case where the operator server 410 transmits information to the wireless devices using the direct SMS/CBS interface 620, the following description is made of other embodiments in which the operator server 410 identifies and handles the wireless device based on the IP protocol like a wired device.

The operator server 410 supports the service to the wireless and wired devices with the same SOAP application 610. The operator server 410 uses the SMS/CBS interface 620 for SOAP message transmission to the wireless device and sends the SOAP message addressed to the wired device to the TCP/IP layer through HTTP/SMTP 630.

Figure 7:
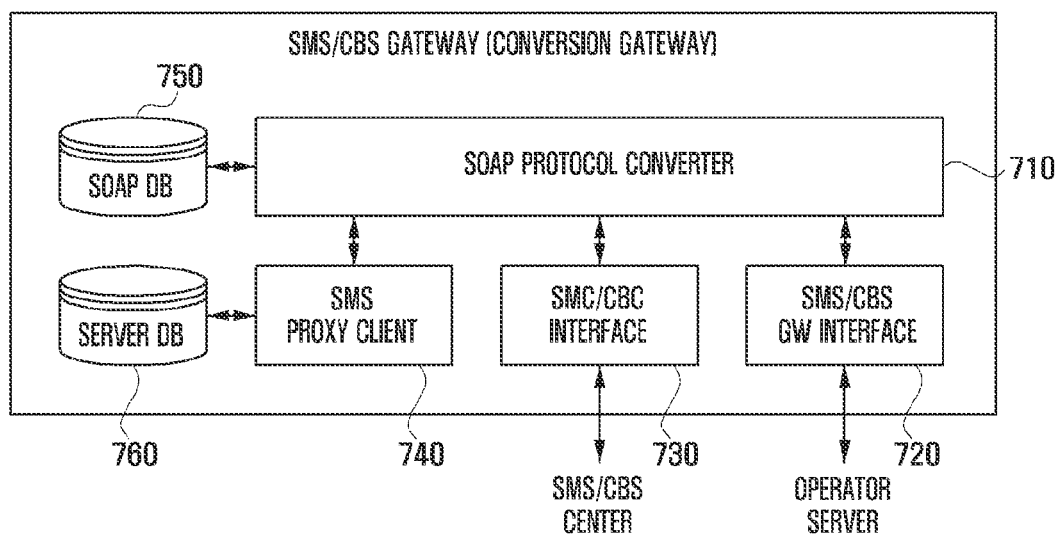
FIG. 7 is a block diagram illustrating the configuration of the SMS/CBS gateway 440 according to an embodiment of the present invention.

FIG. 7 is a block diagram illustrating the configuration of the SMS/CBS gateway (or conversion gateway) 440 according to an embodiment of the present invention. The SMS/CBS gateway transmits the SOAP message to the wireless devices through the SMS/CBS center 460 according to the request of the operator server 410.

The SOAP protocol converter 710 converts the SOAP message received from the operator server 410 to the compressed-SOAP message as proposed in the present invention and converts the compressed-SOAP message received from the wireless device to the SOAP message.

The SMS/CBS gateway interface 720 provides a communication interface with the operator server 410.

The SMC/CBS gateway 730 provides an interface for delivering the request from the operator server to the SMS/CBS center 460.

The SMS proxy client 740 receives the SOAP message to terminate the SMS protocol when the wireless device transmits the SOAP message to the operator server 410 through SMS. The SMS proxy client 740 is responsible for delivering the corresponding SOAP request to the operator server 410 through the interface with the operator server 410.

The SOAP database (SOAP DB) 750 includes the information for the SOAP protocol converter 710 to convert the SOAP message to the compressed-SOAP message and vice versa.

The server database (server DB) 760 is used for managing information on the connection to the operator server 410 at the SMS/CBS GW interface 720. The informations of the corresponding DBs are described later in detail.

Figure 8:
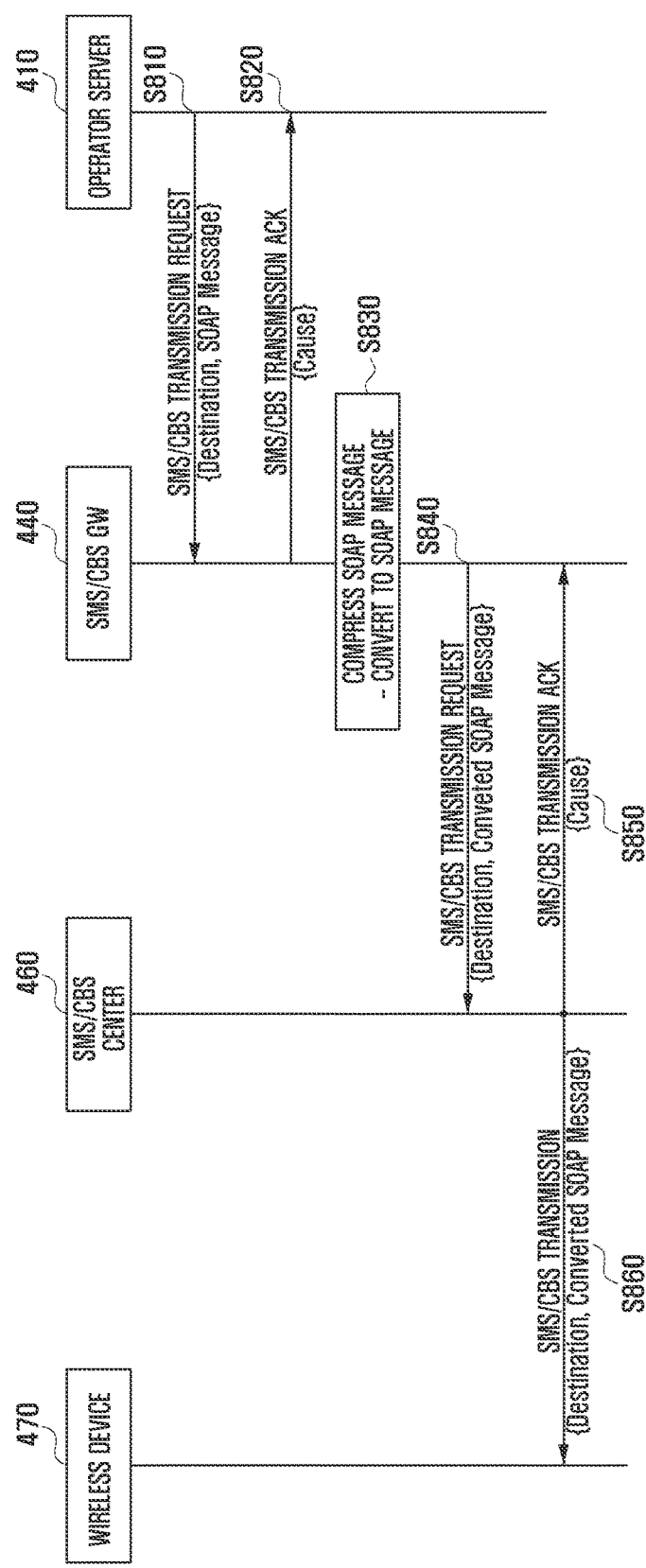
FIG. 8 is a signaling diagram illustrating message flows in transmitting SOAP message from the operator server 410 to the wireless device 470 according to an embodiment of the present invention.

FIG. 8 is a signaling diagram illustrating message flows in transmitting SOAP message from the operator server 410 to the wireless device 470 according to an embodiment of the present invention. In the signaling diagram of FIG. 8, each arrow is marked with the message name thereabove and the information carried by the message therebelow.

First, the operator server 410 sends the SMS/CBS gateway 440 an SMS/CBS Transfer Request message at step S810. In this case, the SMS/CBS Transfer Request message includes the SOAP message for delivery and recipient identity information (destination) of the recipient wireless device to which the SOAP message is addressed. In the case that the operator server 410 instructs the wireless device to activate SMS as shown in FIG. 4, Mobile Station International Subscription Directory Number (MSISDN) is used as the recipient identity information. In another case that the operator server 410 transmits the SOAP message through CBS, if the CBS is capable of group transmission, the information on the area for broadcasting the information is transmitted.

If the SMS/CBS transfer request is received, the SMS/CBS gateway 440 sends the operator server 410 an SMS/CBS Transfer Acknowledgement (SMS/CBS Transfer ACK) to notify of the successful receipt of the SOAP message at step S820.

FIG. 8 is directed to the case where the SMS/CBS Transfer request is transmitted successfully but, in the case of transmission failure, a message having the cause field set to a value indicating error and, afterward, the message transmission/reception is suspended.

The SMS/CBS gateway 440 converts the SOAP message received from the operator server 410 to compressed-SOAP message for delivery to the wireless device through SMS or CBS. The description on the procedure for converting the SOAP message to a compressed-SOAP message is made later in detail.

The SMS/CBS gateway 440 also sends the SMS/CBS center 460 the SMS/CBS Transfer request message including the compressed-SOAP message and the identifier of the recipient wireless device of the compressed-SOAP message at step S840. In this case, the SMS/CBS gateway 440 transmits the message to the SMS center for unicast to a UE and the CBS center for broadcast/group transmission.

Here, the SMS/CBS Center 460 is a legacy wireless communication network device and not modified in the present invention. The SMS/CBS Center 460 sends the SMS/CBS gateway 440 an SMS/CBS Transfer ACK according to the legacy standard specification at step S850, this message including a cause field being set to a value indicating error in an erroneous situation and suspending afterward message transmission/reception.

Finally, the SMS/CBS center 460 sends the wireless device 470 the compressed-SOAP message through the SMS or CBS at step S860.

Figure 9:
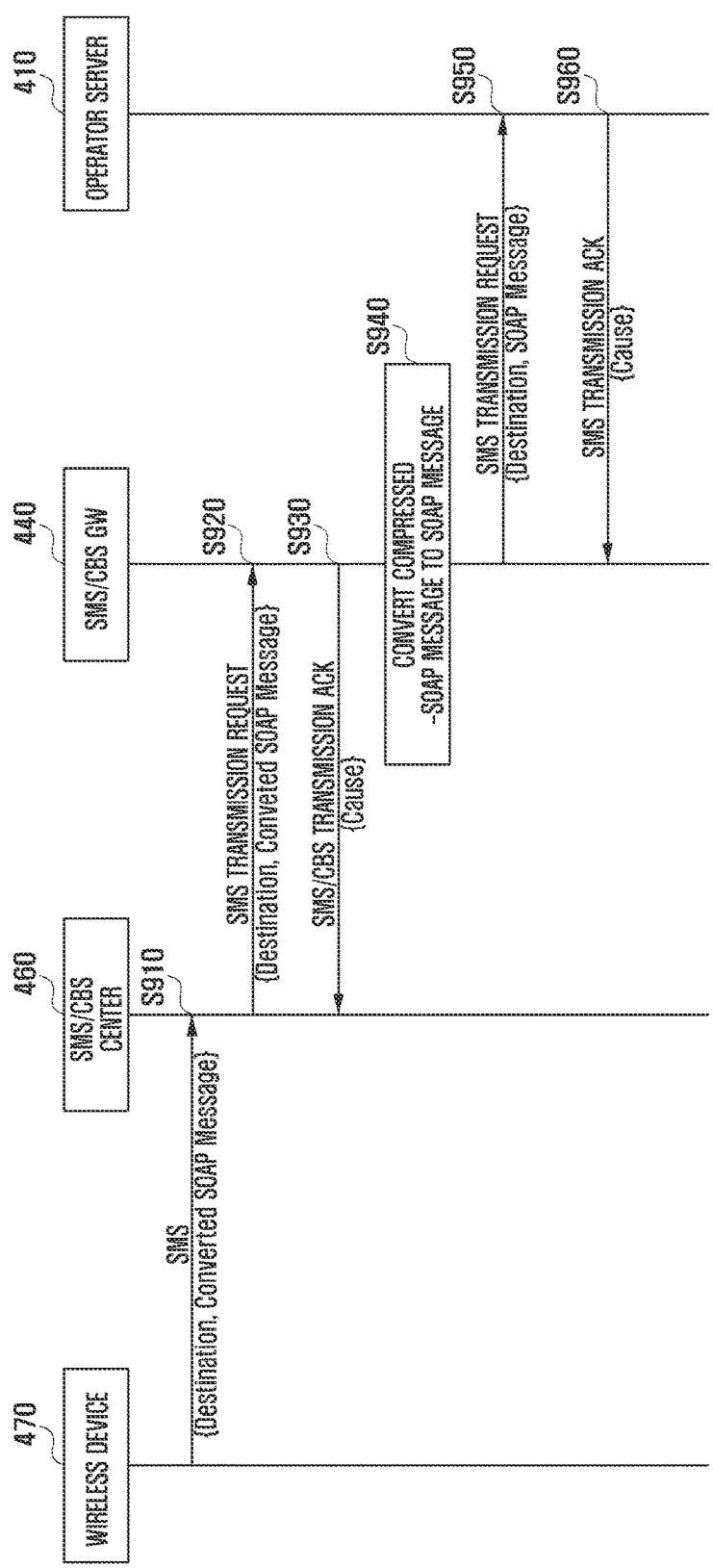
FIG. 9 is a signaling diagram illustrating the procedure of transmitting information from the wireless device 470 to the operator server.

FIG. 9 is a signaling diagram illustrating the procedure of transmitting information from the wireless device 470 to the operator server.

If it is necessary to transmit certain information to the operator server 410, the wireless device 470 generates a SOAP message. For this purpose, the wireless device 470 converts the SOAP message to a compressed-SOAP message format by means of the SOAP protocol converter 520.

Next, the wireless device 470 sends the SMS/CBS center 460 the SMS message containing the compressed-SOAP message at step S910. The SMS message includes the identity information of the operator server 410 to receive the compressed-SOAP message.

Upon receipt of the message, the SMS center 460 checks the operator server identity information in the corresponding message and routes the corresponding SMS message to the SMS/CBS gateway 440 having the interface to the corresponding operator server. This follows the routing operation between standard SMS servers.

For this purpose, the SMS transfer request message is sent from the SMS center 460 to the SMS/CBS gateway 440 at step S920. The SMS transfer request message includes the compressed-SOAP message transmitted by the wireless device 470 and the recipient identity information (destination) of the operator server.

Upon receipt of the corresponding message, the SMS/CBS gateway 440 sends the SMS center 460 an SMS transfer acknowledgement (SMS transfer ACK) message indicating whether the message received successfully.

Although the above-description is directed to the case of successful receipt of the message; if a certain problem occurs, the cause filed of the message is set to a value indicating erroneous situation and, afterward, message transmission/reception stops.

The SMS/CBS gateway 440 extracts the compressed-SOAP message from the successfully received SMS message. Next, the SMS/CBS gateway 440 converts the compressed-SOAP message to the original SOAP message at step S940.

Next, the SMS/CBS gateway 440 sends the operator server 410 the SMS transfer request message containing the SOAP message at step S950. If the SMS transfer request message is received successfully, the operator server 410 sends the SMS/CBS gateway 440 an SMS transfer ACK message at step S960 to complete the SOAP message transmission procedure.

Otherwise, if there is a problem in SMS transfer request message transmission/reception, the operator server 410 sets the cause field of the response message to a value indicating error so as to stop message transmission/reception afterward.

A description is made of the procedure of converting the conventional SOAP message to a compressed-SOAP message appropriate for low speed small size data transmission through the SOAP protocol convertor and transmitting the compressed-SOAP message to the SMS/CBS center 460 hereinafter in detail.

FIG. 10 is a diagram illustrating a data format of a normal SOAP message.

FIG. 10 shows a schema file defined with eXtensible Markup Language (XML) in the format of a function exchangeable through SOAP protocol (XML Schema Definition).

In the schema definition file, the schema name space 'interfaceURI' corresponds to the group name of the SOAP message-based function to be described hereinafter.

In the corresponding group, current fRequest function and fResponse function are defined in a <type name=' . . . '> construction. The definition of each function ends with <Wtype>. If the corresponding function has an input value, <element> construction is used with the name of the input value in the name field and the property of the input value in the type construction.

The schema definition file depicted in FIG. 10 is of the schema definition on the most normal SOAP function and follows the standard SOAP schema definition rule. In summary, fRequest function has two input values, the first named as a1 in floating type (real number) and the second as a2 in floating type. Also, rResponse function receives a variable named as a2 firstly and a real number variable named as result secondly.

In the case that the devices use the functions defined in the corresponding schema file, the items related to the corresponding function is transmitted to the remote counterparty in the form of XML file format as shown in FIGS. 11 and 12 such that the remotely located devices can transmit/receive function call and result.

FIG. 11 is a diagram illustrating the grammar used for calling the fRequest function defined in FIG. 10 to a remote device.

As shown in FIG. 11, the SOAP message is enveloped by an Envelop construction, and a part of calling the real function is enveloped by a Body construction. In the Envelope construction, the version information of the corresponding SOAP message, and 'urn:schemas-xmlsoap-org: soap.v1' of FIG. 11 means that the SOAP standard specification version 1.0 is used.

As shown in the Body of the SOAP message, fRequest function is called. The first input value a1 is the real value of 24. Also, the second input value a2 is 87.

Likewise, FIG. 12 also shows fResponse function called with two input values of a2 and result set to 87.5 and 2.4 respectively.

It is noticed that the SOAP messages shown in FIGS. 11 and 12 are large in size by taking notice that the XML document is written in alphabetic characters and with long constructions. Typically, the size of a message increases as the function title is elongated and the number of functions increases.

The above-described SOAP protocol converters 520 and 710 of FIGS. 5 and 7 include the function for converting the corresponding SOAP message to a compressed-SOAP message capable of being transmitted through SMS/CBS.

For this purpose, the SOAP protocol converter 520 and 710 extracts the information on the SOAP function defined newly by the corresponding operator server 410 as shown in FIG. 13 from the schema definition file (XML Schema Definition) defining the SOAP functions as shown in FIG. 10. In this embodiment, it is assumed that the operator server 410 defines two functions, i.e. fRequest and fResponse, newly.

Referring to FIG. 13, it is shown that the corresponding schema function group (Schema Name) includes two functions of fRequest and fResponse (Method name) as interface URI. Each has two input values (Parameter Number) and specifies the type of the input values are real numbers (float).

The information of FIG. 13 extracted from the XML schema definition file of FIG. 10 includes the additional information such as SOAP version for the operator server 410 using the corresponding SOAP schema file to generate a Method Index Table as shown in FIG. 14.

In the method index table, the informations of SOAP functions used in the operator server 410 are listed, a Method Index as unique number in the corresponding method index table is allocated to the respective functions. As shown in FIG. 14, the method index of fRequest is 01, and the method index of fResponse is 02.

Figure 15:
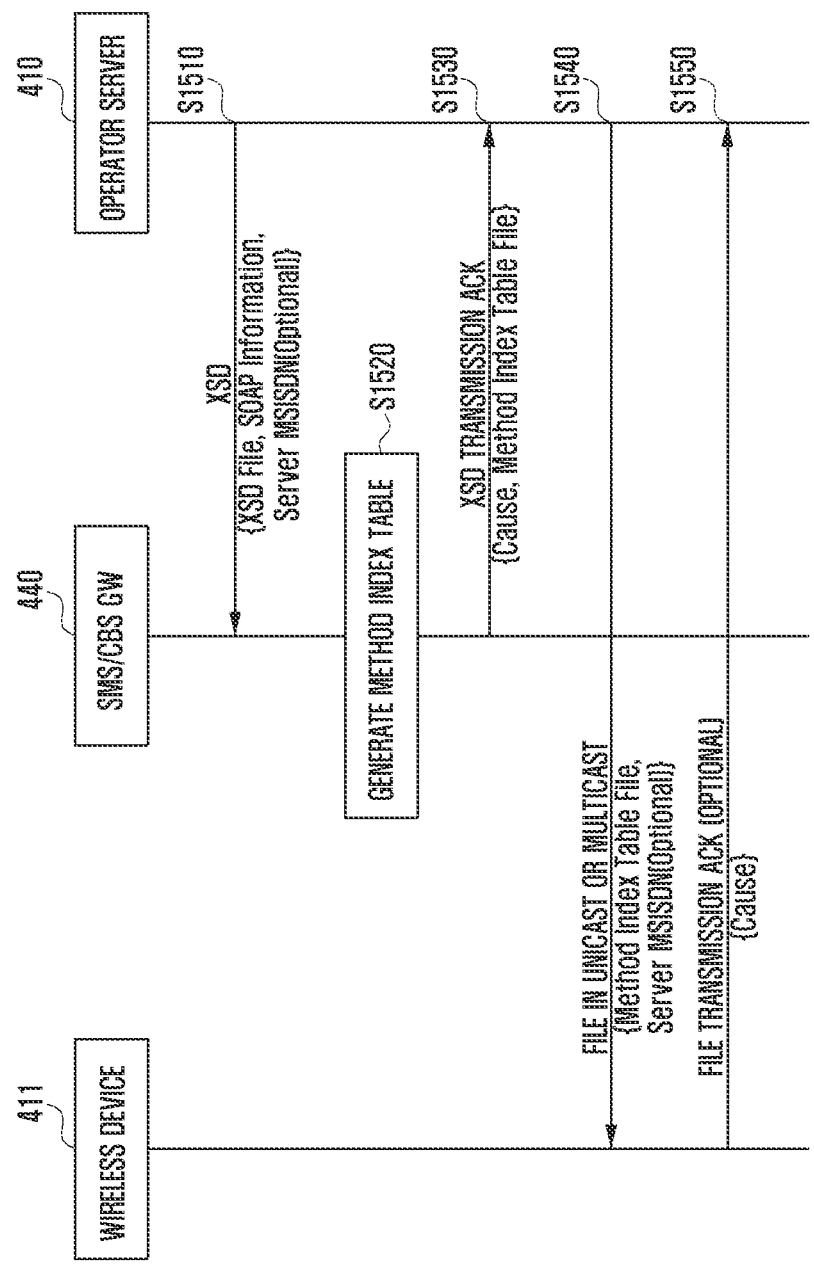
FIG. 15 is a signaling diagram illustrating the timing and procedure of generating the Method Index Table defined according to an embodiment of the present invention.

FIG. 15 is a signaling diagram illustrating the timing and procedure of generating the Method Index Table defined according to an embodiment of the present invention.

FIG. 15 shows the pre-processing procedure between the operator server 410 and the wireless device for processing the SOAP message before transmission. That is, the SOAP protocol convertor 520 and 710 of the SMS/CBS gateway 440 or the wireless device 470 saves the method index table generated through the procedure of FIG. 15 and performs conversion between SOAP message and compressed-SOAP message based on the method index table.

First, the operator server 410 sends the SMS/CBS gateway 440 a schema definition transfer (XSD) message at step S1510. In this case, the schema definition transfer message may include XSD file as XML schema definition file, corresponding SOAP version information (SOAP Information), and operator server identity information (Server MSISND). The SOAP information is identical with the content of the corresponding field of FIG. 14 and used in recovering the original SOAP message afterward.

Figure 16:
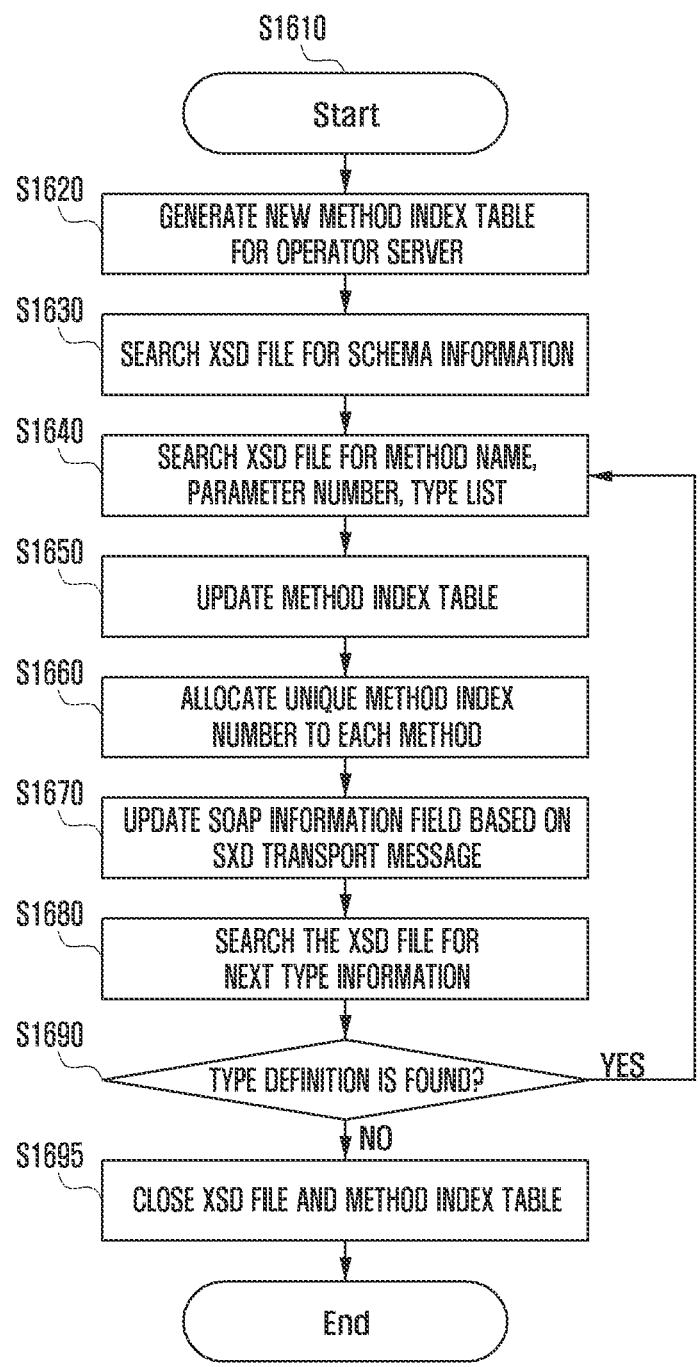
FIG. 16 is a flowchart illustrating the procedure of generating the method index table at the SMS/CBS gateway 440 according to an embodiment of the present invention.

If the XSD file is received through the schema definition transfer message (XSD Transfer), the SMS/CBS gateway 440 generates a method index table through the procedure of FIG. 16 at step S1520. Hereinafter, a description is made of the procedure of generating the method index table at the SMS/CBS gateway 440.

FIG. 16 is a flowchart illustrating the procedure of generating the method index table at the SMS/CBS gateway 440 according to an embodiment of the present invention.

A description is made of step S1620 first. If there exists the conventional method index table file for the corresponding operator server 410 and if the method index table is updated with new information, the SMS/CBS gateway 440 uses the conventional file. Otherwise, if a new method index table is generated for the corresponding operator server 410, the SMS/CBS gateway 440 generates a new method index table.

Afterward, the SMS/CBS gateway 440 extracts the function (grammar) newly defined by the operator server from the schema definition file. In order to achieve this, the SMS/CBS gateway 440 extracts the group name (schema information) of the SOAP functions which is positioned on top of the schema definition file of FIG. 10 and performs addition update operation for the individual functions. For the update operation, the SMS/CBS gateway 440 extracts the method name, parameter number, and Typelist for the individual functions from the schema definition file at step S1640.

Next, the SMS/CBS gateway 440 stores the extracted information in the method index table at step S1650. In this case, the SMS/CBS gateway 440 allocates unique method index number per function and updates the SOAP information field based on the XSD transport message at step S1670.

The method index table generation procedure is repeated until all the functions of the schema definition file (XSD File) are registered with the method index table. For this purpose, the SMS/CBS gateway 440 searches for next type information from the schema definition file at step S1680. If a new type definition is found, the SMS/CBS gateway 440 returns the procedure to step S1640 to perform the rest part of the procedure at step S1690. Otherwise, if no new type definition is found, the SMS/CBS gateway 440 ends the method index table generation procedure at step S1695.

The description returns to FIG. 15. The SMS/CBS gateway 440 sends the operator server 410 the method index table generated at step S1520 (FIG. 16) through the schema definition transport acknowledgement message (XSD Transfer ACK). The schema definition transport acknowledgement message include the cause field indicating whether the transmission is successful or fails. In the corresponding operation fails, the subsequent operations are not performed.

Meanwhile, the conversion between the SOAP message and the compressed-SOAP message is performed at the SMS/CBS gateway 440 and the wireless device 470, the method index table file is stored in the SOAP database 750 of the SMS/CBS gateway 440 and the SOAP database 550 of the wireless device 470.

For this purpose, the operator server 410 sends the wireless devices 470 the corresponding method index table in Unicast or Multicast/Broadcast manner at step S1540. Each of the wireless devices 470 store the method index tables in the SOAP database.

The wireless device 470 is capable of transmitting to the operator server 410 a file transfer acknowledgement message (ACK) notifying of the success or failure of the transmission of the corresponding information additional at step S1550.

The operator server 410 is also capable of registering MSISDN as its identity information with the SMS/CBS Gateway 440 for receiving SMS from the wireless device 470 in addition to the XSD file and method index table, and the registration can be made according to the operator's configuration.

Also, the wireless device 470 may receive the MSISDN as the identity information of the corresponding operator server 410 in a separate field the method index table or in the file for SMS transmission to the operator server 410.

FIG. 17 is a diagram illustrating the identifier and MSISDN of the operator server 410 that are stored in the server database of the SMS/CBS gateway 440 and the wireless device 470.

The SMS/CBS gateway 440 and the wireless device 470 acquired the method index table are capable of exchanging SOAP messages through SMS/CBS. A description is made of the transmission/reception direction of the SOAP message.

Figure 18:
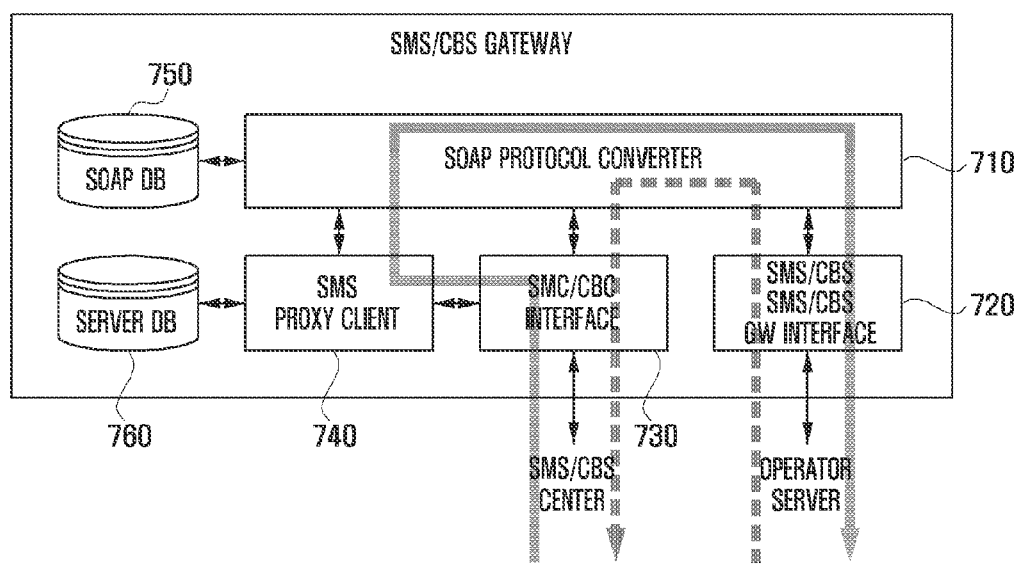
FIG. 18 is a diagram illustrating a module related to the SOAP message and compressed-SOAP message transmission/reception at the SMS/CBS gateway 440 according to an embodiment of the present invention.

FIG. 18 is a diagram illustrating a module related to the SOAP message and compressed-SOAP message transmission/reception at the SMS/CBS gateway 440 according to an embodiment of the present invention.

In FIG. 18, the SOAP message transmission from the operator server 410 is depicted as dotted line. That is, the SOAP message transmitted by the operator server 410 is input to the SOAP protocol converter 710 via the SMS/CBS gateway interface 720. In this case, the SOAP protocol converter 710 converts the SOAP message to a compressed-SOAP message using the method index table stored in the SOAP database 750 and inputs the compressed-SOAP message to the SMC/CBC interface 730. The compressed-SOAP message is forwarded to the SMS/CBS center 460.

In contrast, the SMS transmitted from the SMS center to the wireless device 470 is input to the SMS proxy client 740 through the SMC/CBC interface 730. The SMS proxy client 740 terminates the SMS protocol and input the corresponding SMS to the SOAP protocol converter 710. The SOAP protocol converter 710 recovers the SOAP message from the compressed-SOAP message included in the SMS using the method index table stored in the SOAP database 750. The recovered SOAP message is forwarded to the operator server 410 through the SMS/CBS gateway interface 720.

FIG. 19 is a diagram illustrating a compressed-SOAP message format converted from fRequest message of FIG. 11 to be fit for SMS/CBS transmission using the method index table.

As shown in FIG. 19, the compressed-SOAP message conversion can be performed in 4 modes, and the conversion mode can be set in initial configuration between the operator server 410 and the wireless device 470. However, the conversion mode determination is not limited to the initial configuration but can be made dynamically by adding information defining the mode per message in the method index table or defining a mode to be applied commonly to all the messages between the operator server 410 and the wireless device 470.

Prior to explanation on the four modes compressed-SOAP messages, a description is made of the procedure for converting a SOAP message to a compressed-SOAP message.

Figure 20:
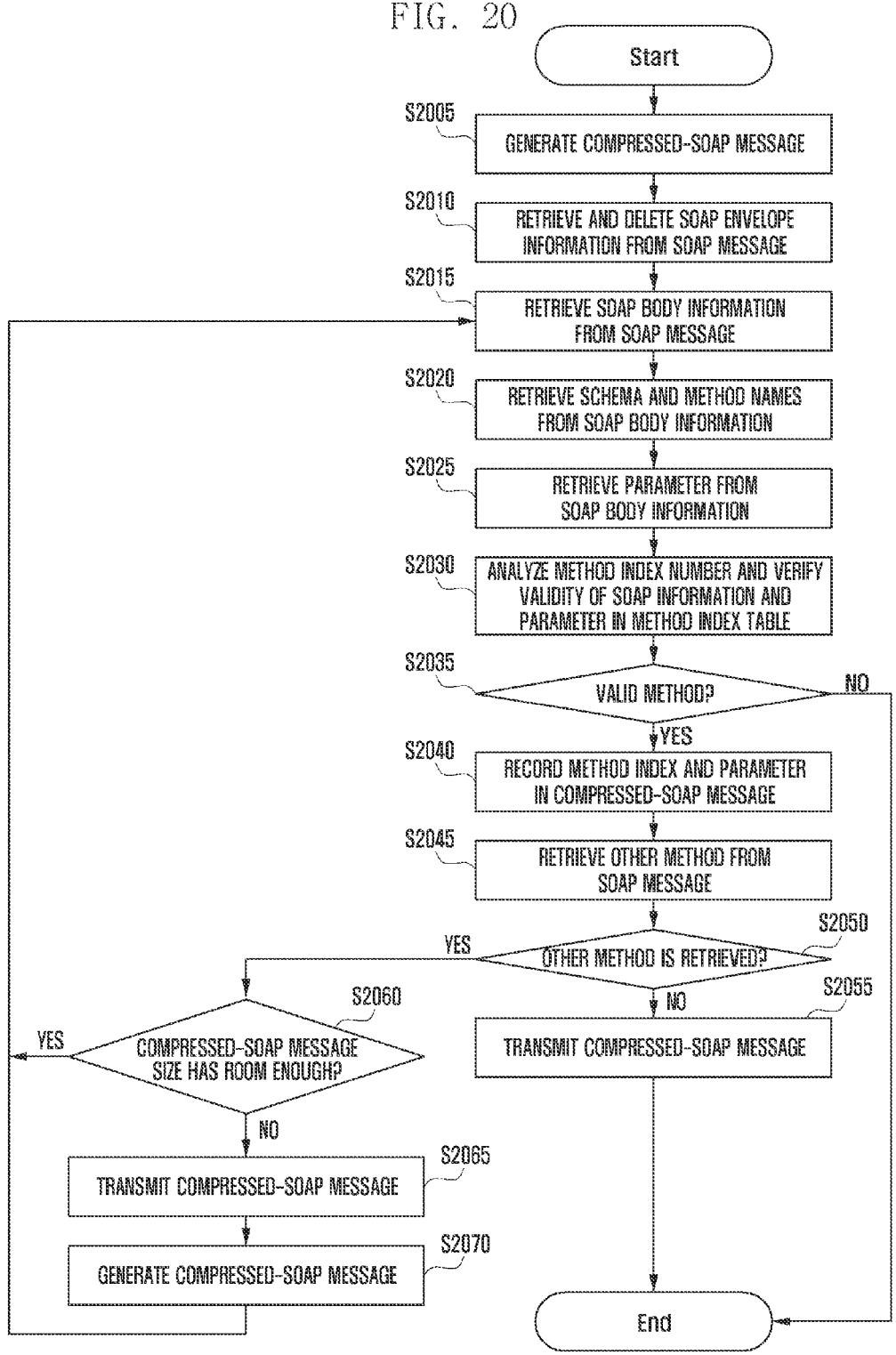
FIG. 20 is a flowchart illustrating the procedure of converting a SOAP message to a compressed-SOAP message.

FIG. 20 is a flowchart illustrating the procedure of converting a SOAP message to a compressed-SOAP message. The procedure of FIG. 20 can be performed by the SOAP protocol converters 520 and 710 included in the wireless device 470 or the SMS/CBS gateway 440.

First, if the SOAP message is received, the SOAP protocol converter 520 or 710 generates a Converted SOAP message for recording the result at step S2005. The SOAP protocol converter 520 or 710 retrieves and deletes the SOAP Envelope information (<SOAP:Envelopxmlns:SOAP='urn:schemas-smlsoap-org:soap.V1'>, </SOAP:Envelop>) to be used between the operator server 410 and the wireless device 470 in the received SOAP message as described above.

The SOAP protocol converter 520 or 710 searches the SOAP message for the BODY information construction at step S2015. The SOAP protocol converter 520 or 710 extracts the function name (schema and method name, e.g. 'fRequest') as the content exchanged actually through SOAP message from the retrieved BODY information at step S2020. The SOAP protocol converter 520 or 710 extracts the input values of 24 and 87 to the extracted function at step S2025.

Next, the SOAP protocol converter 520 or 710 verifies the validity of the SOAP information based on the extracted content at step S2030. In order to verify the validity, the SOAP protocol converter 520 or 710 retrieves a pair of schema name ('interfaceURI') and method name ('fRequest') and searches for the function corresponding to the number of input values and type.

If the method index ('01') for the corresponding function is extracted, the SOAP protocol converter 520 or 710 determines that the method of the retrieved content is valid at step S2035 and records the extracted method index and input values in the compressed-SOAP message at step S2040.

If the received SOAP message includes plural functions, the above operation is performed in such a way of recording in the compressed-SOAP message for all the messages or processing the functions as many as transmittable through SMS/CBS message.

For this purpose, the SOAP protocol converter 520 or 710 determines whether another method is retrieved at step S2050 and, if not retrieved, transmits the compressed-SOAP message to the corresponding destination at step S2055. Otherwise, if another method is retrieved, the SOAP protocol converter 520 and 710 determines whether the SOAP message size has room enough at step S2060. If the SOAP message size has room enough, the procedure returns to step S2015 to perform subsequent operations. Otherwise, if the SOAP message size has no room, the SOAP protocol converter 520 or 710 transmits the compressed-SOAP message to the destination at step S2065 and completes generation of the compressed-SOAP message at step S2070.

FIG. 19 shows a format of the compressed-SOAP message converted form the content of FIG. 11. Referring to FIG. 19, it is shown that the function name fRequest and two input values of 24 and 87 of FIG. 11 are extracted to generate the compressed-SOAP message. In the present invention, each field is delimited by ':'. This can be used as delimiter for another purpose. Although the description is directed to the conversion of the SOAP message and SOAP message communication between the wireless device 470 and the operator server 410, if another protocol is used, separate type identity information can be used at the beginning point of the compressed-SOAP message for identification of the content of the SMS. For example, the identity information such as 0x00 can be used for indicating that the corresponding message is a converted SOAP message. The currently considered 4 types are described hereinafter in sequence as shown in FIG. 19.

The character mode is of facilitating debugging when a certain problem occurs by making it easy for the user to read the corresponding information content. Accordingly, all of the numbers and characters are written as a character string in a human-legible format.

The binary mode is of processing each position as 8-bit binary number other than character. In this case, it is necessary to define the size per number such as 16-bit integer number and 32-bit real number in advance between the operator server 410 and the wireless device 470. In the drawing, the method index is transformed from 01 to 0x01, and input values of 24 and 87 are expressed as 16-bit integers. In the case of using the binary mode, it is aimed to increase the processing speed and decrease the message size by negating the procedure for calling the function and converting the 'text' to a certain number at the called device.

The character mode without delimiter and the binary mode with delimiter are of removing the delimiter ':', and these modes are possible because the fields can be distinguished from each other due to the information on the type and the number of input values in the method index table.

Meanwhile, FIG. 21 is a diagram illustrating a format of the compressed-SOAP message converted from the fResponse message of FIG. 12 to be fit for SMS/CBS transmission using the method index table.

Unlike FIG. 19, FIG. 21 shows that the real number type information with decimal point.

The conversion from the SOSP message to the compressed-SOAP message as depicted in FIG. 20 can be performed when the SMS/CBS gateway 440 receives the SMS/CBS Transfer request message from the operator server 410 in the procedure of FIG. 8. Also, it can be performed in the procedure of performing the SMS Transfer through SMS in the wireless device 470 of FIG. 9.

Figure 22:
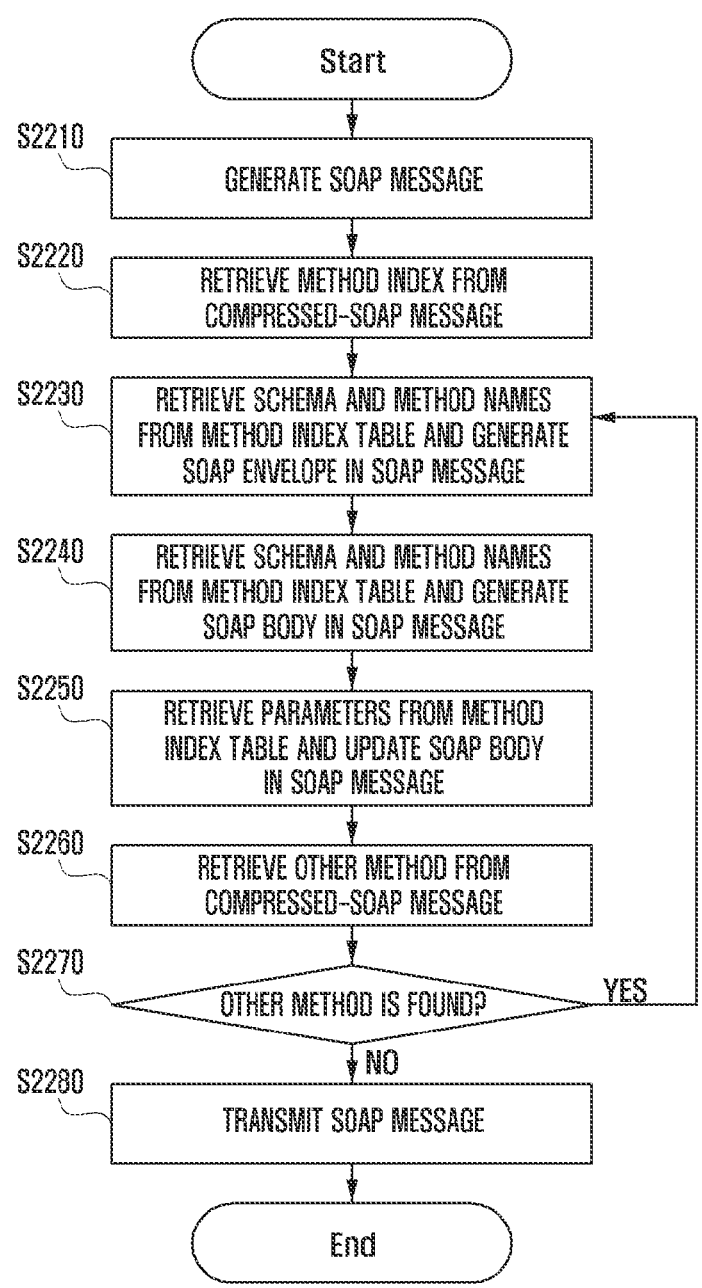
FIG. 22 is a flowchart illustrating the procedure of converting the compressed-SOAP message to the original SOAP message as the inverse procedure of FIG. 20.

FIG. 22 is a flowchart illustrating the procedure of converting the compressed-SOAP message to the original SOAP message as the inverse procedure of FIG. 20.

That is, FIG. 22 shows the procedure of recovering the format of FIGS. 19 and 21 to the format of FIGS. 11 and 12. The procedure of FIG. 22 can be performed by the SOAP protocol converters 520 and 710 included in the wireless device 470 or the SMS/CBS gateway 440.

The SOAP protocol converter 520 or 710 recovers the original SOAP message at step S2210. Next, the SOAP protocol converter 520 or 710 extracts a method index from the compressed-SOAP message at step S2220. Next, the SOAP protocol converter 520 or 710 extracts the 'urn: schemas-xmlsoap-org:soap.V1' information as the version information of the corresponding SOAP message from the method index table and composes a SOAP Envelope construction in the SOAP message as follows. The following construction is of an exemplary fRequest message, and the underlined part is recovered using the SOAP database of FIG. 14 while other parts are recovered according to the standard SOAP grammar.

<SOAP:Envelope xmlns:SOAP='urn:schemas-xmlsoap-org:soap.V1'>
</SOAP:Envelope>

Next, the SOAP protocol converter 520 or 710 extracts the schema name and method name corresponding to the method index to write the SOAP Body construction.

<SOAP:Envelope xmlns:SOAP='urn:schemas-xmlsoap-org:soap.V1'>

-continued

```
<SOAP:Body>
<i:fRequestxmlns:i='interfaceURI'>
</i:f>
</SOAP:Body>
</SOAP:Envelope>
```

Next, the SOAP protocol converter 520 or 710 extracts the number of input values defined in the method index table according to the type from the compressed-SOAP message (Converted SOAP) and completes the input value constructions.

```
<SOAP:Envelope xmlns:SOAP='urn:schemas-xmlsoap-org:soap.V1'>
<SOAP:Body>
<i:fRequestxmlns:i='interfaceURI'>
<a1>24</a1>
<a2>87</a2>
</i:f>
</SOAP:Body>
</SOAP:Envelope>
```

Subsequently, the SOAP protocol converter 520 or 710 determines whether any additional function exists at step S2260. Next, if it is determined that any additional function exists, the SOAP protocol converter 520 or 710 returns the procedure to step S2220 to perform the subsequent steps repeatedly. Otherwise, if it is determined that no additional function exists, the SOAP protocol converter 520 and 710 transmits the recovered original SOAP message as the result value at step S2280.

Figure 23:
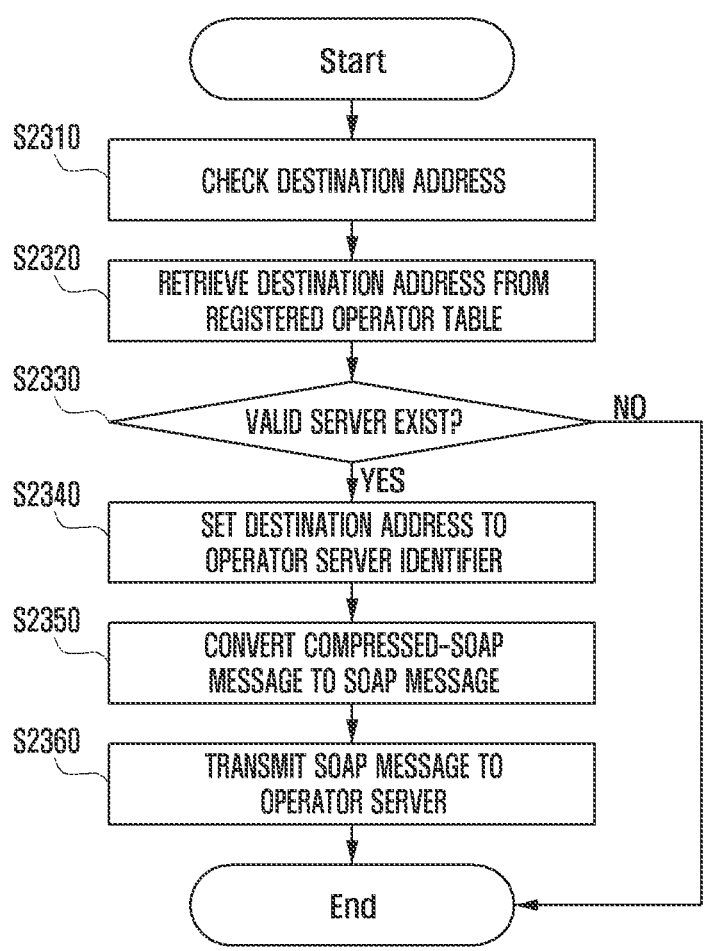
FIG. 23 is a flowchart illustrating the procedure of recovering the SOAP message after terminating the SMS protocol without forwarding the SMS message from the corresponding SMS/CBS gateway 440 to the operator server 410 when the SMS/CBS gateway 440 receives the SMS transmitted from the wireless device 470 to the operator server 410.

FIG. 23 is a flowchart illustrating the procedure of recovering the SOAP message after terminating the SMS protocol without forwarding the SMS message from the corresponding SMS/CBS gateway 440 to the operator server 410 when the SMS/CBS gateway 440 receives the SMS transmitted from the wireless device 470 to the operator server 410.

First, the SMS proxy client 740 of the SMS/CBS gateway 440 terminates the SMS protocol of the SMS message routed by the SMS center 460. The SMS proxy client 740 checks the destination address of the SMS message at step S2310 and then retrieves the checked destination address from the registered operator server table at step S2320.

Next, the SMS proxy client 740 determines whether a valid server exists at step S2330 and, if so, sets the destination address to the operator server identifier at step S2340.

The SOAP protocol converter 710 converts the compressed-SOAP message to the SOAP message at step S2350 and transmits the original SOAP message to the operator server 410 at step S2360.

As described above, the present invention can be implemented in other embodiments as well as the embodiments described with FIG. 4 as the representative drawing. Additional embodiments of the present invention are described hereinafter. The detailed descriptions of the structures (function blocks, etc.) described already in the first embodiment are omitted herein.

Figure 24:
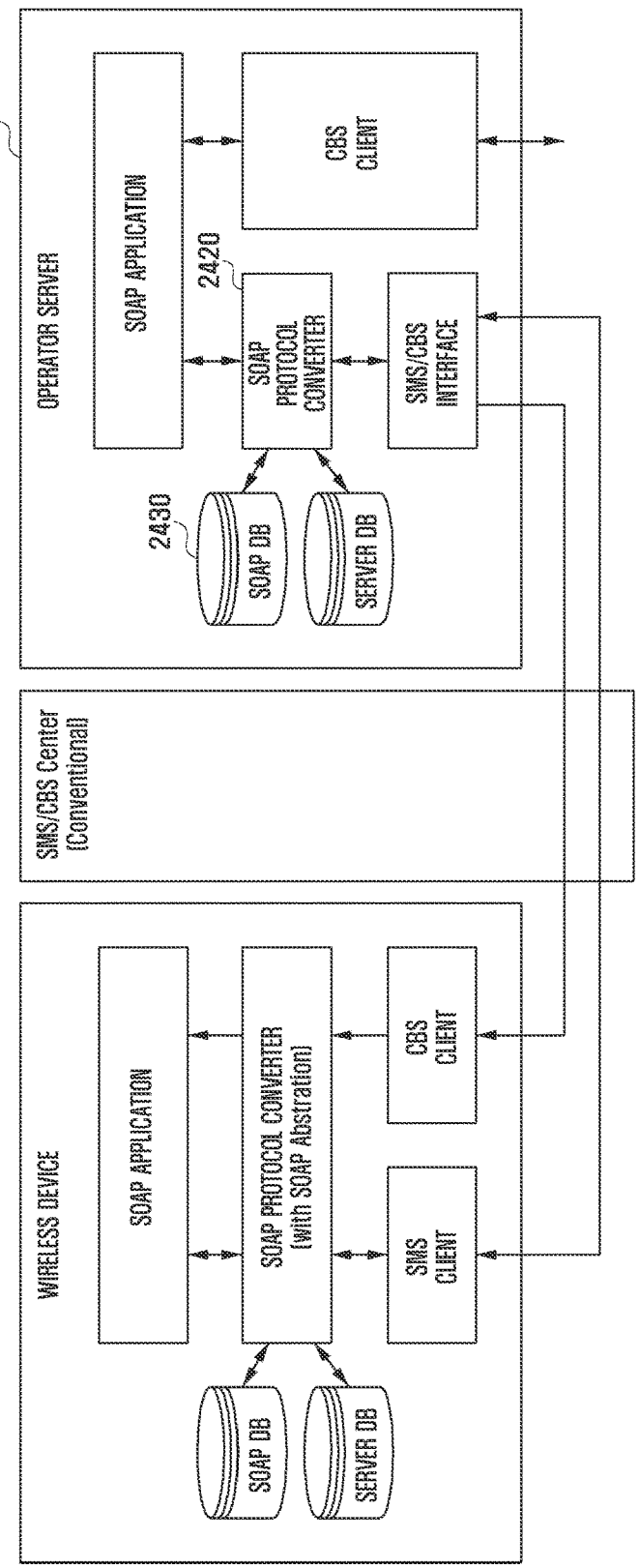
FIG. 24 is a block diagram illustrating the architecture of a network according to the first additional embodiment of the present invention.

The first additional embodiment is the case where the SOAP message conversion is performed by the operator server without SMS/CBS gateway as depicted in FIG. 24.

The operator server 2410 integrates the SOAP protocol converter 2420 such that the SOAP message is transmitted in the compressed-SOAP message format already at the time point when the SOAP message is transmitted from the operator server 2410 to the wireless communication network. In order to accomplish this, the operator server 2410 includes the SOAP database 2430, and the SMS/CBS gateway function is performed entirely by the operator server 2410. In this case, the operator server accesses the service of the SMS/CBS center directly.

Figure 25:
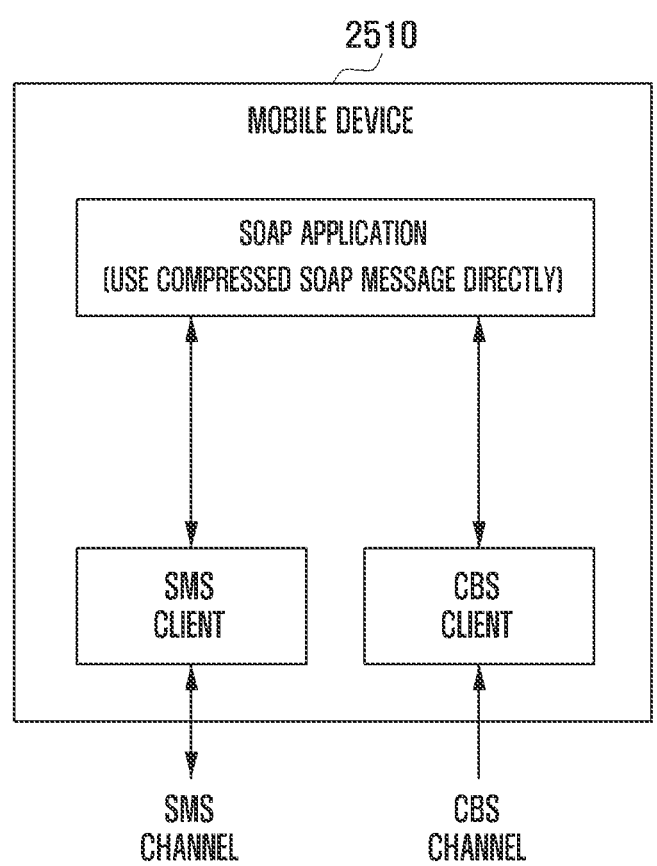
FIG. 25 is a block diagram illustrating the configuration of the wireless device according to the second additional embodiment of the present invention.

The second additional embodiment is the case where the wireless device 2510 uses the compressed-SOAP message as direct input and modifies the SOAP message of the wireless device 2510 so as to be output as direct compressed-SOAP message as depicted in FIG. 25. This embodiment is advantageous to avoid the processing load caused by protocol conversion.

The third embodiment is the case where the operator server does not recognize SMS/CBS and thus deliver the information based on the IP addresses of the corresponding terminals.

Figure 26:
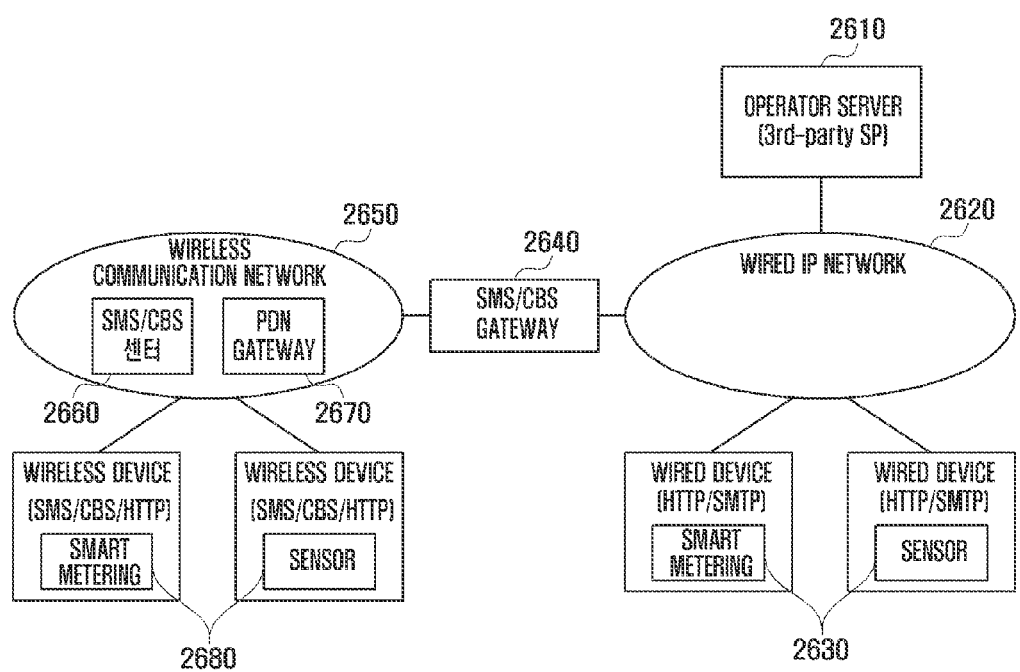
FIG. 26 is a diagram illustrating the architecture of the wireless communication network according to the third additional embodiment.

FIG. 26 is a diagram illustrating the architecture of the wireless communication network according to the third additional embodiment.

The functions of the operator server 2610 and the wired device 2630 are identical with those of the embodiment of FIG. 4. In the embodiment, however, the wireless devices 2680 are modified to support IP network protocol HTTP/SMTP as well as SMS/CBS. Accordingly, the corresponding terminals can use the dedicated wireless packet channel and connect to the Internet through PDN gateway (PGW) 2670 for IP communication.

In this case, the SMS/CBS gateway 2640 is capable of performing other functions in addition of the functions defined in FIG. 4. That is, the SMS/CBS gateway 2640 bypasses the normal IP message, which is not SOAP message, transparently without any process.

For this purpose, the SMS/CBS gateway 2640 can be 1) installed transparent on the communication link connecting between the Internet and PGW 2670, 2) added as supplementary function of switch/router connecting the PGP 2670 and the SMS/CBS gateway 2640, or 3) implemented as an internal function of the gateway 2640.

Figure 27:
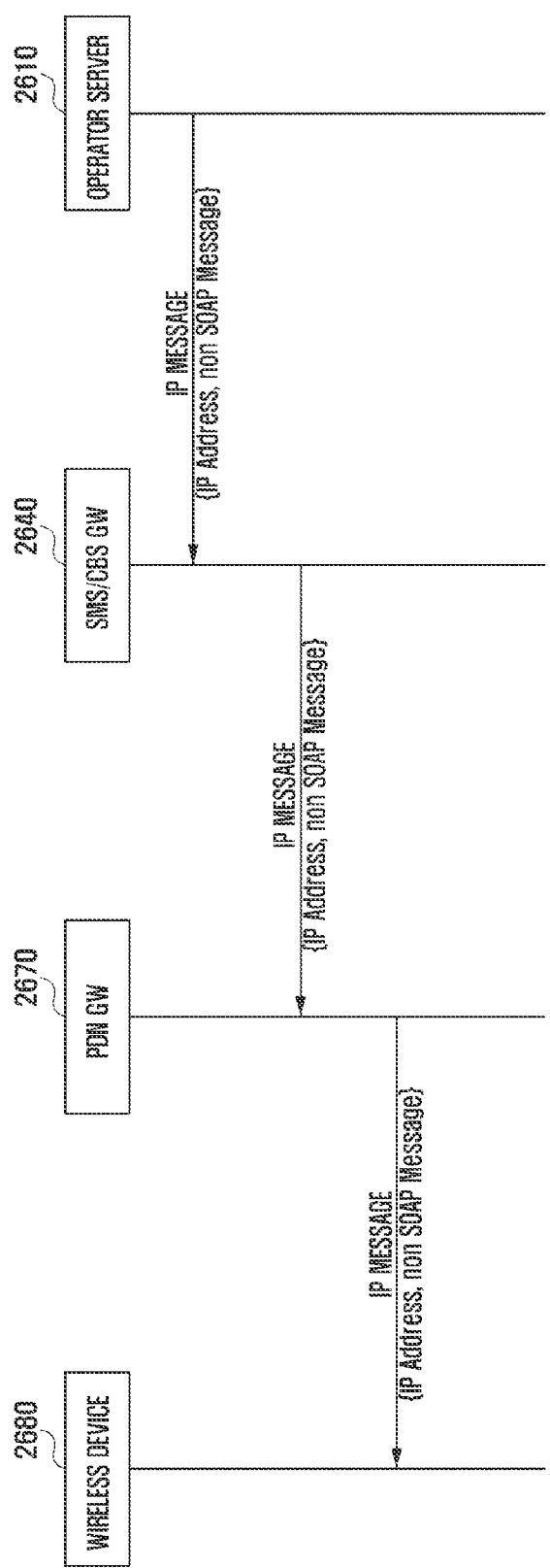
FIGS. 27 and 28 are signaling diagrams illustrating SOAP message transmission procedures according to the third additional embodiment of the present invention.

In FIG. 27, the destination can be an IP address of the wireless device 2680 or a multicast IP address for a group of wireless devices 2680.

Figure 28:
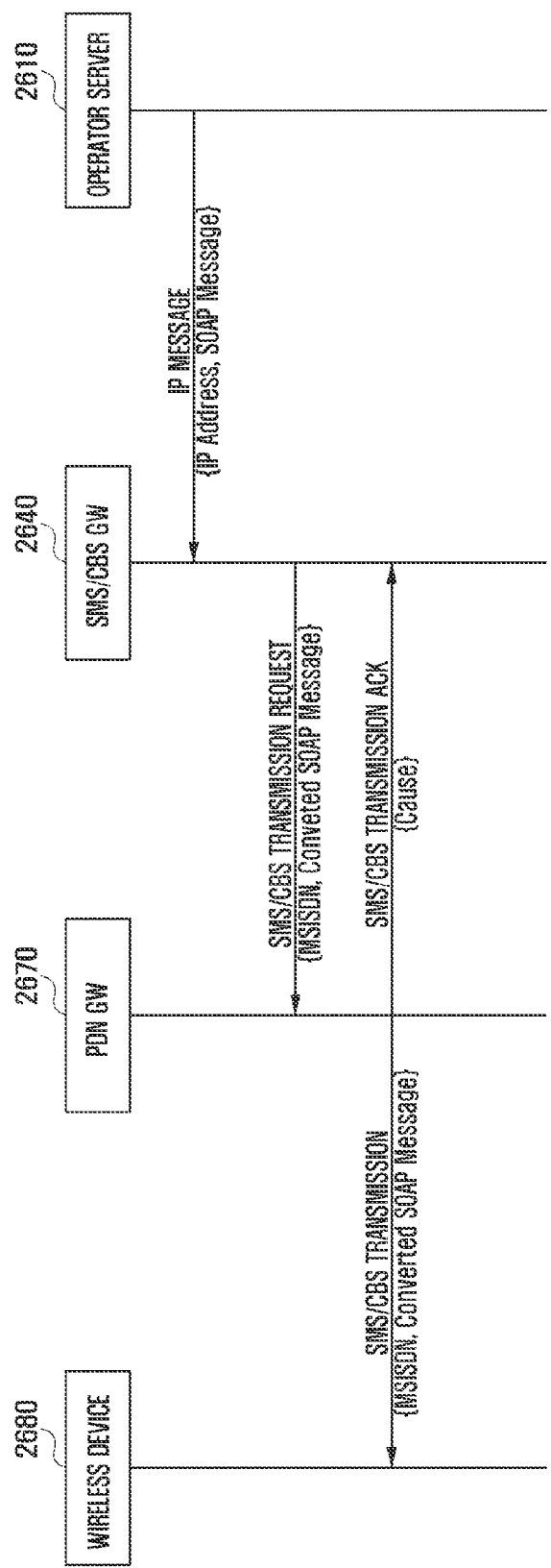

Meanwhile, if the SOAP message is transmitted by the operator server 2610, the corresponding SOAP message is detected at the SMS/CBS gateway 2640 such that the SOAP message is converted to the compressed-SOAP message as shown in FIG. 28. The converted SOAP message is delivered to the wireless device 2680 via SMS/CBS center 2670 as described above.

In FIG. 28, the MSISDN is used in consideration of SMS, however, if CBS is used and the CBS supports a group identifier for identifying a specific group, the group identifier can be used as recipient identifier.

Figure 29:
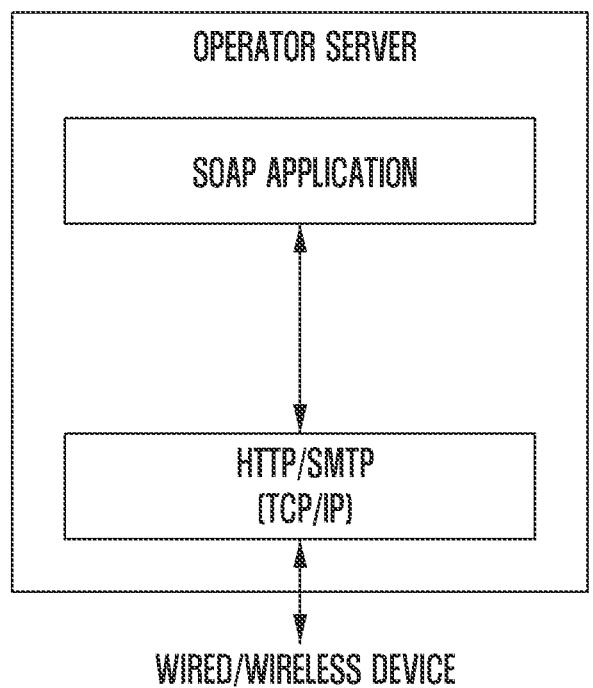
FIG. 29 is a block diagram illustrating the configuration of the operator server 2610 according to the third additional embodiment.

FIG. 29 is a block diagram illustrating the configuration of the operator server 2610 according to the third additional embodiment.

According to the third additional embodiment of the present invention, since the wires device 2680 also perform IP communication, it is not necessary for the operator server 2610 to have a separate SMS/CBS interface.

Figure 30:
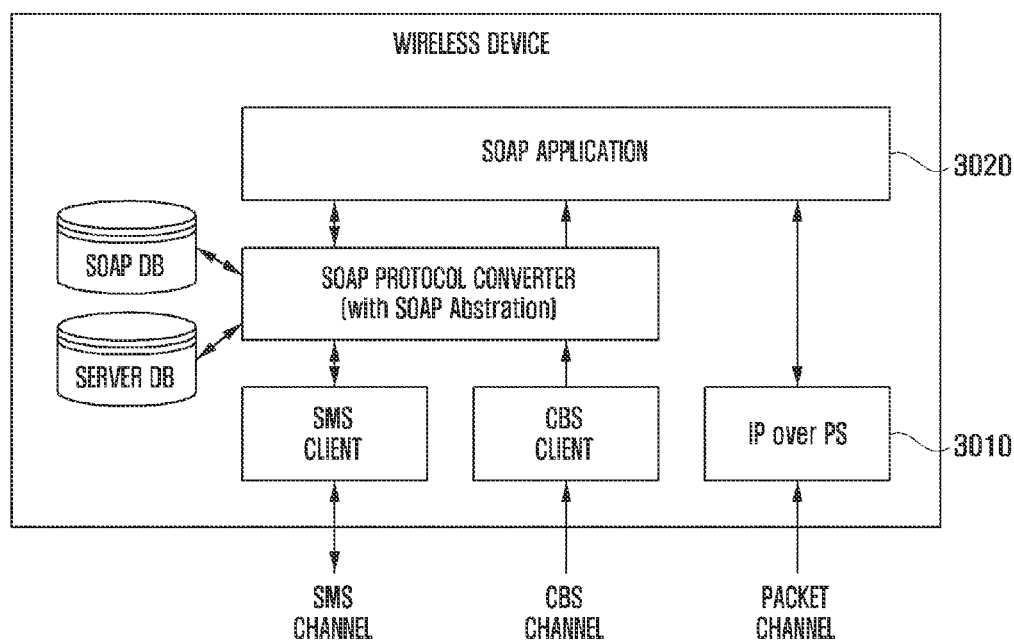
FIG. 30 is a block diagram illustrating the configuration of the wireless device 2680 according to the third additional embodiment of the present invention.

FIG. 30 is a block diagram illustrating the configuration of the wireless device 2680 according to the third additional embodiment of the present invention.

The wireless device 2680 according to the third additional embodiment supports the high speed packet channel for IP communication separately as well as the SMS/CBS. Accordingly, the wireless device 2680 includes a module 3010 for IP over Packet Switch and transfers the information transmitted/received through the corresponding module to the SOAP application 3020 directly.

Figure 31:
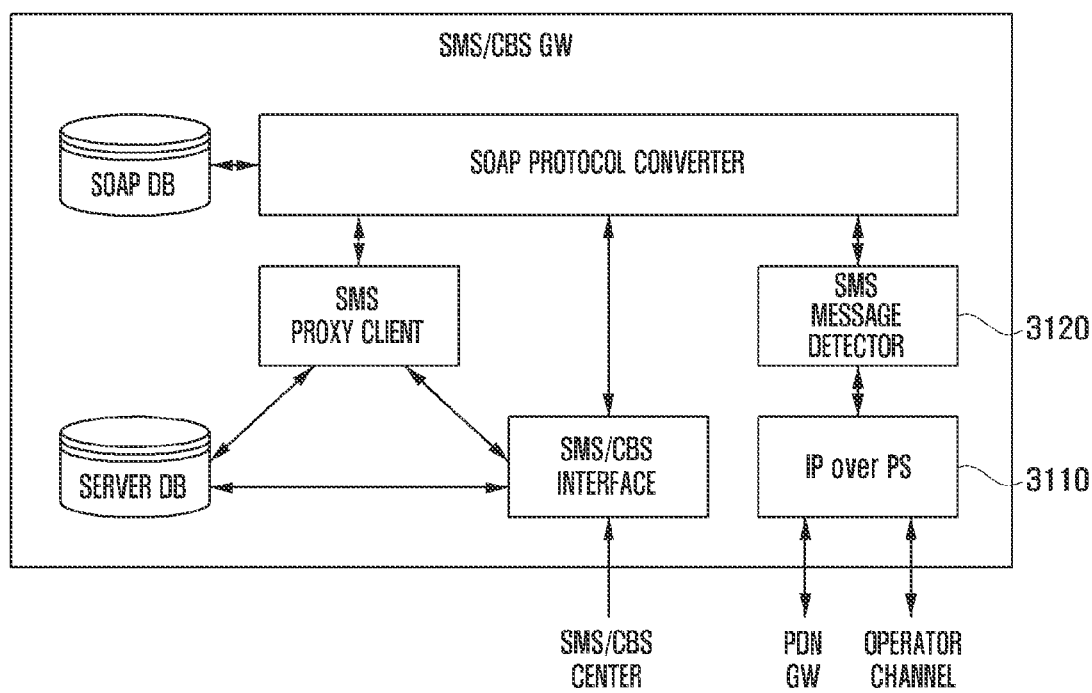
FIG. 31 is a block diagram illustrating the configuration of the SMS/CBS gateway 2640 according to the third addition embodiment of the present invention.

FIG. 31 is a block diagram illustrating the configuration of the SMS/CBS gateway 2640 according to the third addition embodiment of the present invention.

The modified part is the interface to the operator server 2610 such that if the HTTP/SMTP is applied an HTTP/SMTP processing module 3110 is included. The SOAP message to be converted uses the corresponding SOAP protocols such that the packet carrying no HTTP/SMTP data is forwarded to the PGW 2670.

The HTTP/SMTP packet is checked to determine whether it includes SOAP message, and this is in charge of the SOAP message detector 3120. Hereinafter, a description is made of the operations of the SOAP message detector 3120 in detail.

Figure 32:
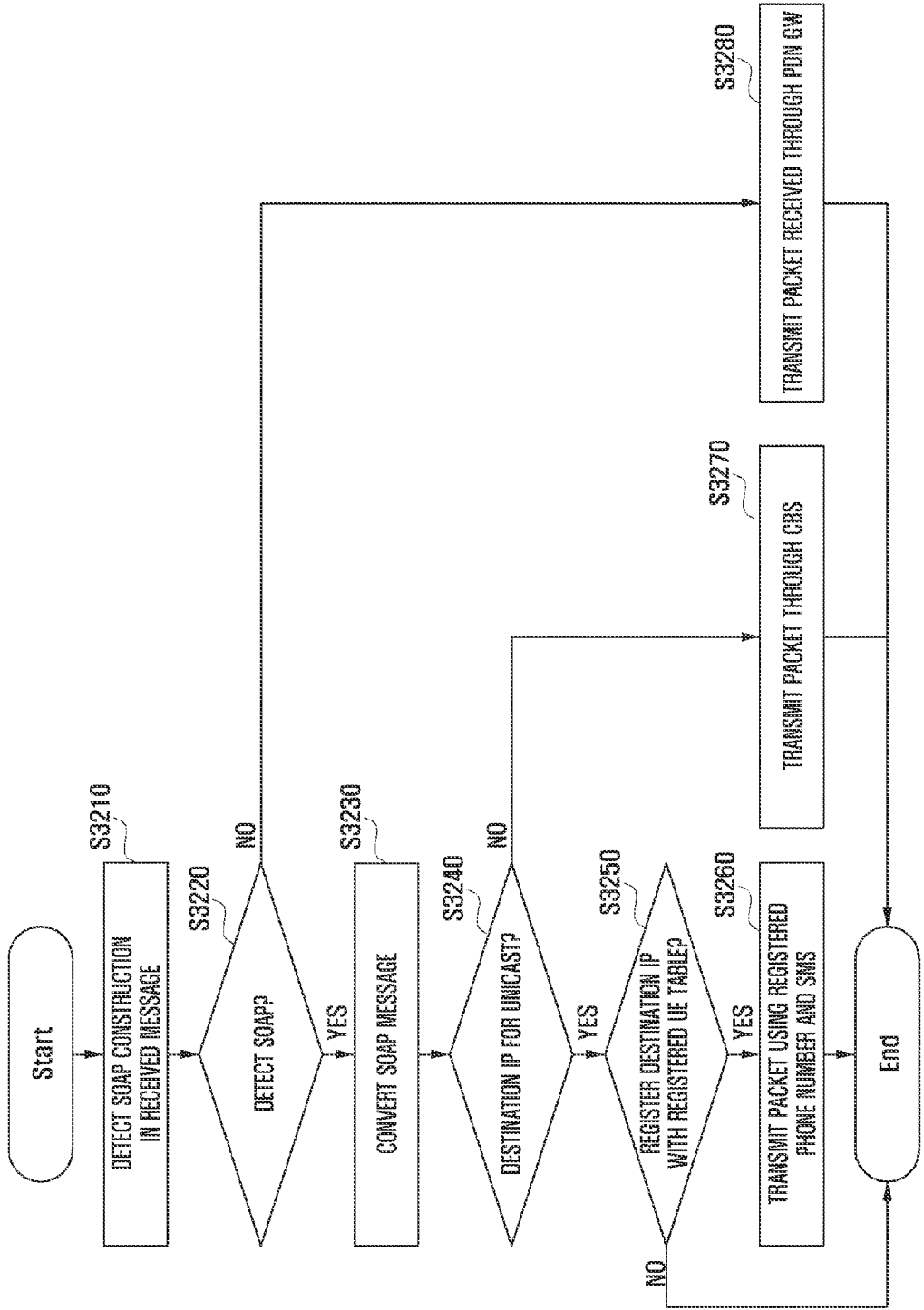
FIG. 32 is a flowchart illustrating the operations of the SOAP message detector 3120.

FIG. 32 is a flowchart illustrating the operations of the SOAP message detector 3120.

First, the SOAP message detector 3120 detects an SOAP construction in the received message at step S3210. Next, the SOAP message detector 3120 detects the SOAP message at step S3220 and converts the SOAP message to the compressed-SOAP message as described above. Otherwise, if no SOAP is detected, the SMS/CBS gateway 2640 forwards the received message to the corresponding destination via PGW at step S3280.

In the case of SOAP message, the SOAP message detector 3120 determines whether the destination IP address is a unicast IP address and whether EH is multicast/broadcast at step S3240. If the destination IP address is the unicast IP address, the IP address has to be replaced by MSISDN corresponding to the wireless device for delivery through SMS.

For this purpose, the server database of the SMS/CBS gateway 2640 stores a registered terminal table (Registered UE Table). The registered UE table can be set in the SMS/CBS gateway 2640 automatically or manually at the time of initial connection setup with the operator server 2610. Accordingly, the SMS/CBS gateway 2640 is capable of transmitting the corresponding compressed-SOAP message to the wireless device using the MSISDN corresponding to the destination IP address at steps S3250 and S3260.

Otherwise, if the destination address of the SOAP message is a multicast/broadcast IP address, the corresponding message is transmitted through CBS at step S3270.

Figure 34:
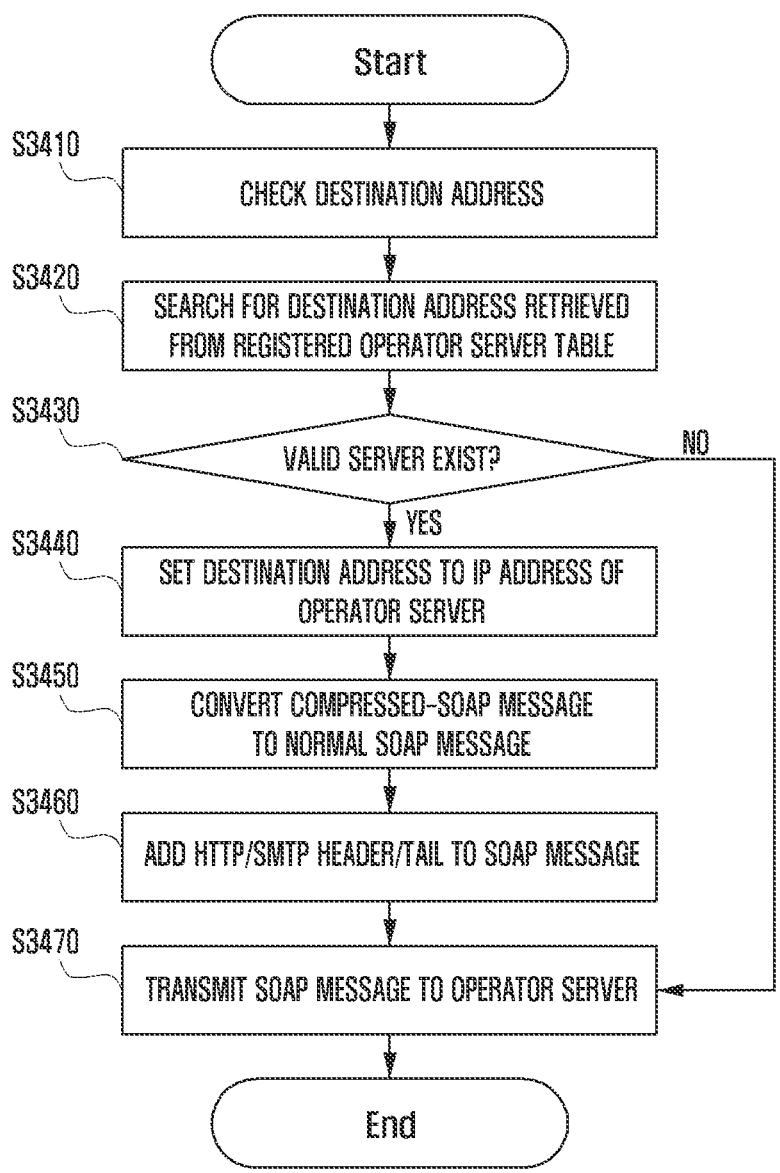
FIG. 34 is a flowchart illustrating operations of the SMS/CBS gateway 2640 when the wireless device 2680 transmits an SMS message to the operator server 2610 in the second additional embodiment of the present invention.

FIG. 34 is a flowchart illustrating operations of the SMS/CBS gateway 2640 when the wireless device 2680 transmits an SMS message to the operator server 2610 in the second additional embodiment of the present invention.

First, the SMS/CBS gateway 2640 checks the destination address of the SMS message received from the wireless device 2680 at step S3410. The SMS/CBS gateway 2640 searches the registered service server table as shown in FIG. 35 for the checked destination address at step S3420. If it is determined that a valid server exists at step S3430, the SMS/CBS gateway 2640 sets the destination address to the operator server IP address at step S3440. Next, the SMS/CBS gateway 2640 converts the compressed-SOAP message to the original SOAP message at step S3450. Next, the SMS/CBS gateway 2640 adds HTTP/SMTP header/tail to the soap message at step S3460. Finally, the SMS/CBS gateway 2640 transmits the recovered SOAP message to the operator server 2610 at step S3470.

As described above, the present invention is capable of SOAP-based message transmission/reception in an environment where the IP service is not supported.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method, by a gateway, for transmitting/receiving an internet protocol (IP) based simple object access protocol (SOAP) message, the method comprising:
   receiving a schema definition file including pre-defined functions by a server, from the server;
   generating an index table based on the pre-defined functions by the server, for compressing or decompressing a SOAP message;
   transmitting the generated index table to the server and a terminal;
   compressing a first SOAP message to a first compressed-SOAP message based on the index table to be transmitted using a short message service (SMS) message, if a request for transmission of the first SOAP message is received from the server;
   transmitting the first compressed-SOAP message using a non-IP based protocol to the terminal;
   receiving, using the non-IP based protocol, a second compressed-SOAP message that is compressed based on the index table to be transmitted using an SMS message by the terminal, if a second SOAP message is transmitted from the terminal to the server;
   decompressing the second compressed-SOAP message to the second SOAP message based on the index table; and
   transmitting the second SOAP message to the server,
   wherein the compressing of the first SOAP message comprises:
       extracting functions and input values of the functions from the received first SOAP message;
       determining whether a method index for the extracted functions and the extracted input values exists based on the index table; and
       compressing, if the method index exists, the received first SOAP message to the first compressed-SOAP message by recording the method index, the extracted functions, and the extracted input values.

2. The method of claim 1, wherein the non-IP based protocol comprises a cell broadcast service (CBS).

3. The method of claim 1, wherein the pre-defined functions comprise newly defined functions.

4. The method of claim 3, wherein the index table comprises at least one of a method index, a schema name, a method name, number of input values, input value type, or SOAP version for each of the newly defined functions.

5. The method of claim 1, wherein the compressing of the first SOAP message further comprises:
   deleting SOAP version information from the received first SOAP message.

6. The method of claim 1, wherein decompressing of the second compressed-SOAP message further comprises:
   extracting a method index from the second compressed-SOAP message;
   retrieving SOAP version information from the index table; and
   generating a construction including the SOAP version information, schema name, method name, number of input values, and input values.

7. A gateway for transmitting/receiving an internet protocol (IP) based simple object access protocol (SOAP) message, the gateway comprising:
a transceiver configured to transmit and receive a signal; and
a controller configured to:
control the transceiver to receive a schema definition file including pre-defined functions by a server, from the server,
generate an index table based on the pre-defined functions by the server, for compressing or decompressing a SOAP message,
control the transceiver to transmit the generated index table to the server and a terminal,
compress a first SOAP message to a first compressed-SOAP message based on the index table to be transmitted using a short message service (SMS) message, if a request for transmission of the first SOAP message is received from the server by:
extracting functions and input values of the functions from the received first SOAP message,
determining whether a method index for the extracted functions and the extracted input values exists based on the index table, and
compressing, if the method index exists, the received first SOAP message to the first compressed-SOAP message by recording the method index, the extracted functions, and the extracted input values,
control the transceiver to transmit the first compressed-SOAP message using a non-IP based protocol to the terminal,
control the transceiver to receive, using the non-IP based protocol, a second compressed-SOAP message that is compressed based on the index table to be transmitted using an SMS message by the terminal, if a second SOAP message is transmitted from the terminal to the server,
decompress the second compressed-SOAP message to the second SOAP message based on the index table, and
control the transceiver to transmit the second SOAP message to the server.

8. The gateway of claim 7, wherein the non-IP based protocol comprises a cell broadcast service (CBS).

9. The gateway of claim 7, wherein the pre-defined functions comprise newly defined functions.

10. The gateway of claim 9, wherein the index table comprises at least one of a method index, a schema name, a method name, number of input values, input value type, or SOAP version for each of the newly defined functions.

11. The gateway of claim 7, wherein the controller is further configured to:
delete SOAP version information from the received first SOAP message.

12. The gateway of claim 7, wherein the controller is further configured to:
extract a method index from the second compressed-SOAP message,
retrieve SOAP version information from the index table, and
generate a construction including the SOAP version information, schema name, method name, number of input values, and input values.

* * * * *